United States Patent
Sutherland

(10) Patent No.: US 11,228,861 B2
(45) Date of Patent: Jan. 18, 2022

(54) EMERGENCY ALERT SYSTEMS WITH CUSTOMIZED ALERTS

(71) Applicant: In-telligent Properties LLC, Chicago, IL (US)

(72) Inventor: Allan C. Sutherland, Orland Park, IL (US)

(73) Assignee: In-telligent Properties LLC, Chicago, IL (US)

(*) Notice: Subject to any disclaimer, the term of this patent is extended or adjusted under 35 U.S.C. 154(b) by 0 days.

(21) Appl. No.: 17/023,793

(22) Filed: Sep. 17, 2020

(65) Prior Publication Data

US 2021/0084436 A1 Mar. 18, 2021

Related U.S. Application Data

(60) Provisional application No. 62/901,390, filed on Sep. 17, 2019.

(51) Int. Cl.
*H04W 4/021* (2018.01)
*H04W 4/90* (2018.01)
(Continued)

(52) U.S. Cl.
CPC .............. *H04W 4/024* (2018.02); *G08B 7/06* (2013.01); *G08B 25/10* (2013.01);
(Continued)

(58) Field of Classification Search
CPC ... H04W 4/024; H04W 12/069; H04W 76/50; H04W 4/021; H04W 4/023; H04W 4/12;
(Continued)

(56) References Cited

U.S. PATENT DOCUMENTS 7,149,533 B2 12/2006 Laird et al.
7,180,415 B2 2/2007 Bankert et al.
(Continued)

FOREIGN PATENT DOCUMENTS

WO 2010009324 A2 1/2010
WO 2014072510 A2 5/2014
(Continued)

OTHER PUBLICATIONS

Apple is Launching a Vast Project to Map the Inside of Every Large Building It Can, Edwards, Business Insider, Jun. 7, 2014, pp. 1-3.
(Continued)

*Primary Examiner* — Chico A Foxx
(74) *Attorney, Agent, or Firm* — Banner & Witcoff, Ltd.

(57) ABSTRACT

Aspects discussed herein relate to providing alerts to a community of devices located in or near a geographic area such as a building or property. The alerts override any alert-inhibiting state of the mobile device to deliver audio, visual, and/or haptic alerts in emergency situations. The communication and emergency alert system may be used to communicate with many different communities of people. Moreover, certain individuals may be members of more than one community at the same time, and the communities themselves may change over time based both on the user's preferences and on their physical locations. Users may set their own preferences for how alerts are provided, such as customizing the visual and/or audible notifications provided for an alert.

17 Claims, 19 Drawing Sheets

(51) Int. Cl.
| | |
|---|---|
| *G08B 25/10* | (2006.01) |
| *H04W 4/024* | (2018.01) |
| *H04W 4/33* | (2018.01) |
| *G08B 7/06* | (2006.01) |
| *H04W 76/50* | (2018.01) |
| *H04W 4/02* | (2018.01) |
| *H04W 4/12* | (2009.01) |
| *H04W 12/069* | (2021.01) |
| *H04L 29/06* | (2006.01) |
| *H04L 29/08* | (2006.01) |

(52) U.S. Cl.
CPC ...... *H04L 63/0853* (2013.01); *H04L 63/0884* (2013.01); *H04L 67/20* (2013.01); *H04W 4/021* (2013.01); *H04W 4/023* (2013.01); *H04W 4/12* (2013.01); *H04W 4/33* (2018.02); *H04W 4/90* (2018.02); *H04W 12/069* (2021.01); *H04W 76/50* (2018.02)

(58) Field of Classification Search
CPC .......... H04W 4/33; H04W 4/90; G08B 25/10; G08B 7/06; H04L 63/0853; H04L 63/0884; H04L 67/20
See application file for complete search history.

(56) References Cited

U.S. PATENT DOCUMENTS

| | | | |
|---|---|---|---|
| 7,460,020 B2 | 12/2008 | Reyes et al. | |
| 7,590,723 B2 | 9/2009 | Mager et al. | |
| 8,001,000 B2 | 8/2011 | Butterworth | |
| 8,013,734 B2 | 9/2011 | Saigh et al. | |
| 8,396,485 B2 | 3/2013 | Grainger et al. | |
| 8,624,727 B2 | 1/2014 | Saigh et al. | |
| 8,792,906 B2 | 7/2014 | Batada et al. | |
| 8,866,673 B2 | 10/2014 | Mendelson | |
| 8,971,930 B2 | 3/2015 | Li et al. | |
| 9,049,555 B2 | 6/2015 | Wang et al. | |
| 9,288,620 B2 | 3/2016 | Menendez | |
| 9,351,114 B2 | 5/2016 | Chatterjee et al. | |
| 9,363,638 B1 | 6/2016 | Jones | |
| 9,549,287 B2 | 1/2017 | Baran et al. | |
| 9,589,435 B2 | 3/2017 | Finlow-Bates | |
| 9,591,444 B2 | 3/2017 | Qiu | |
| 9,712,960 B2 | 7/2017 | Kumar et al. | |
| 9,788,153 B1 | 10/2017 | Newstadt et al. | |
| 9,788,159 B2 | 10/2017 | Wang et al. | |
| 9,826,354 B2 | 11/2017 | Alsina et al. | |
| 9,826,358 B2 | 11/2017 | Ryan et al. | |
| 9,875,251 B2 | 1/2018 | Jones | |
| 9,888,371 B1* | 2/2018 | Jacob | G08B 13/22 |
| 9,900,174 B2 | 2/2018 | Gamberini | |
| 10,251,023 B2* | 4/2019 | Sutherland | G06Q 50/163 |
| 10,650,665 B2* | 5/2020 | Merjanian | H04L 67/26 |
| 2005/0096040 A1* | 5/2005 | Haberman | H04W 4/021 |
| | | | 455/422.1 |
| 2005/0197775 A1* | 9/2005 | Smith | H04W 4/024 |
| | | | 702/3 |
| 2006/0121887 A1* | 6/2006 | Chilukoor | H04M 3/436 |
| | | | 455/412.2 |
| 2006/0293048 A1 | 12/2006 | Swanson et al. | |
| 2008/0189162 A1 | 8/2008 | Ganong et al. | |
| 2010/0121567 A1* | 5/2010 | Mendelson | G06Q 30/0239 |
| | | | 701/467 |
| 2011/0112768 A1 | 5/2011 | Doyle | |
| 2011/0148634 A1 | 6/2011 | Putz | |
| 2012/0084372 A1 | 4/2012 | Cohen | |
| 2013/0099977 A1 | 4/2013 | Sheshadri et al. | |
| 2013/0203445 A1 | 8/2013 | Grainger et al. | |
| 2013/0316740 A1 | 11/2013 | Scarafia et al. | |
| 2014/0057648 A1 | 2/2014 | Lyman et al. | |
| 2014/0066090 A1 | 3/2014 | Henderson | |
| 2014/0220883 A1 | 8/2014 | Emigh et al. | |
| 2014/0280526 A1 | 9/2014 | Filho | |
| 2014/0358666 A1 | 12/2014 | Baghaie et al. | |
| 2015/0031388 A1 | 1/2015 | Chatterjee et al. | |
| 2015/0111524 A1* | 4/2015 | South | H04W 4/021 |
| | | | 455/404.2 |
| 2015/0148061 A1 | 5/2015 | Koukoumidis et al. | |
| 2015/0223022 A1 | 8/2015 | Kumar et al. | |
| 2015/0237470 A1 | 8/2015 | Mayor et al. | |
| 2016/0007156 A1 | 1/2016 | Chiou et al. | |
| 2016/0047663 A1* | 2/2016 | Iyer | G01C 21/206 |
| | | | 701/411 |
| 2016/0049064 A1* | 2/2016 | McNabb | G08B 21/10 |
| | | | 340/540 |
| 2016/0142872 A1 | 5/2016 | Nicholson et al. | |
| 2016/0360360 A1 | 12/2016 | Jones | |
| 2017/0099579 A1 | 4/2017 | Ryan et al. | |
| 2017/0103080 A1 | 4/2017 | Quong | |
| 2017/0103410 A1 | 4/2017 | Kerr et al. | |
| 2017/0148306 A1 | 5/2017 | Wolfson et al. | |
| 2017/0289754 A1 | 10/2017 | Anderson et al. | |
| 2017/0311131 A1* | 10/2017 | South | H04W 4/029 |
| 2018/0054713 A1* | 2/2018 | South | H04W 4/30 |
| 2018/0364654 A1* | 12/2018 | Locke | F24F 11/63 |
| 2018/0365942 A1* | 12/2018 | Molloy | A62B 5/00 |
| 2019/0007548 A1* | 1/2019 | Sit | H04M 1/72457 |
| 2019/0166457 A1* | 5/2019 | Lipowski | H04W 4/022 |
| 2019/0261145 A1* | 8/2019 | South | G01S 1/68 |
| 2020/0084608 A1* | 3/2020 | Chung | H04W 4/02 |
| 2021/0076454 A1* | 3/2021 | Palanivel | G06K 9/00744 |
| 2021/0158666 A1* | 5/2021 | Derickson | G08B 27/001 |
| 2021/0215789 A1* | 7/2021 | Hu | G01S 13/56 |

FOREIGN PATENT DOCUMENTS

| | | |
|---|---|---|
| WO | 2014089462 A2 | 6/2014 |
| WO | 2014206627 A1 | 12/2014 |
| WO | 2015034904 A1 | 3/2015 |

OTHER PUBLICATIONS

Micro-Location for Internet of Things Equipped Smart Buildings, Zafari et al., arXiv:1501.01539 v1, Jan. 7, 2015, pp. 1-16.

* cited by examiner

| Device ID | Device Type | Geolocation | Alert Delivery Path |
|---|---|---|---|
| 12345 | Route | geofence1.dat | Yes - Wi-fi |
| 12346 | Point of Sale | geofence2.dat | No |
| 12347 | Beacon | geofence3.dat | Yes - Bluetooth |
| 12348 | Cell Tower | geofence4.dat | Yes - Cellular |
| ⋮ | | | |
| 99999 | | geofence9.dat | No |

| Modifying Criteria | Message | Haptic | Sound | Visual | Timing |
|---|---|---|---|---|---|
| Geolocation 1 | Do Not Alter | Do Not Alter | Mute | Do Not Alter | Do Not Alter |
| Geolocation 2 | Obscure | Do Not Alter | 10% volume | Do Not Alter | Do Not Alter |
| Geolocation 3 | Do Not Alter | Do Not Alter | Do Not Alter | Do Not Alter | Do Not Alter |
| Community 1 | Do Not Alter | Vibration Pattern 1 | Do Not Alter | Add flash | Do Not Alter |
| Community 2 | Do Not Alter | Vibration Pattern 2 | Do Not Alter | Do Not Alter | Do Not Alter |
| Role 1 | Do Not Alter | Do Not Alter | Tone 1 | Do Not Alter | Do Not Alter |
| Role 2 | Do Not Alter | Do Not Alter | Tone 2 | Do Not Alter | Do Not Alter |

FIG. 8

| Name | Description | Category | Tier | Variable | Action | Type |
|---|---|---|---|---|---|---|
| Fire Alarm | A fire has been detected | General | | All devices within Building | Notification | Text |
| Suspicious Package | An unattended package has been located | Tiered | 1 | Devices within 100' of package | Evacuate Area | Text, Audible, Visual |
| Equipment Malfunction | A piece of equipment has malfunctioned | Tiered | 1 | Maintenance Personnel | Alert Maintenance Personnel | Text, Map |
| Equipment Malfunction | A piece of equipment has critically failed | Tiered | 2 | Maintenance Personnel, Devices within 250' of equipment | Alert Maintenance Personnel, Evacuate Area | Text, Audible, Visual, Map |

FIG. 10

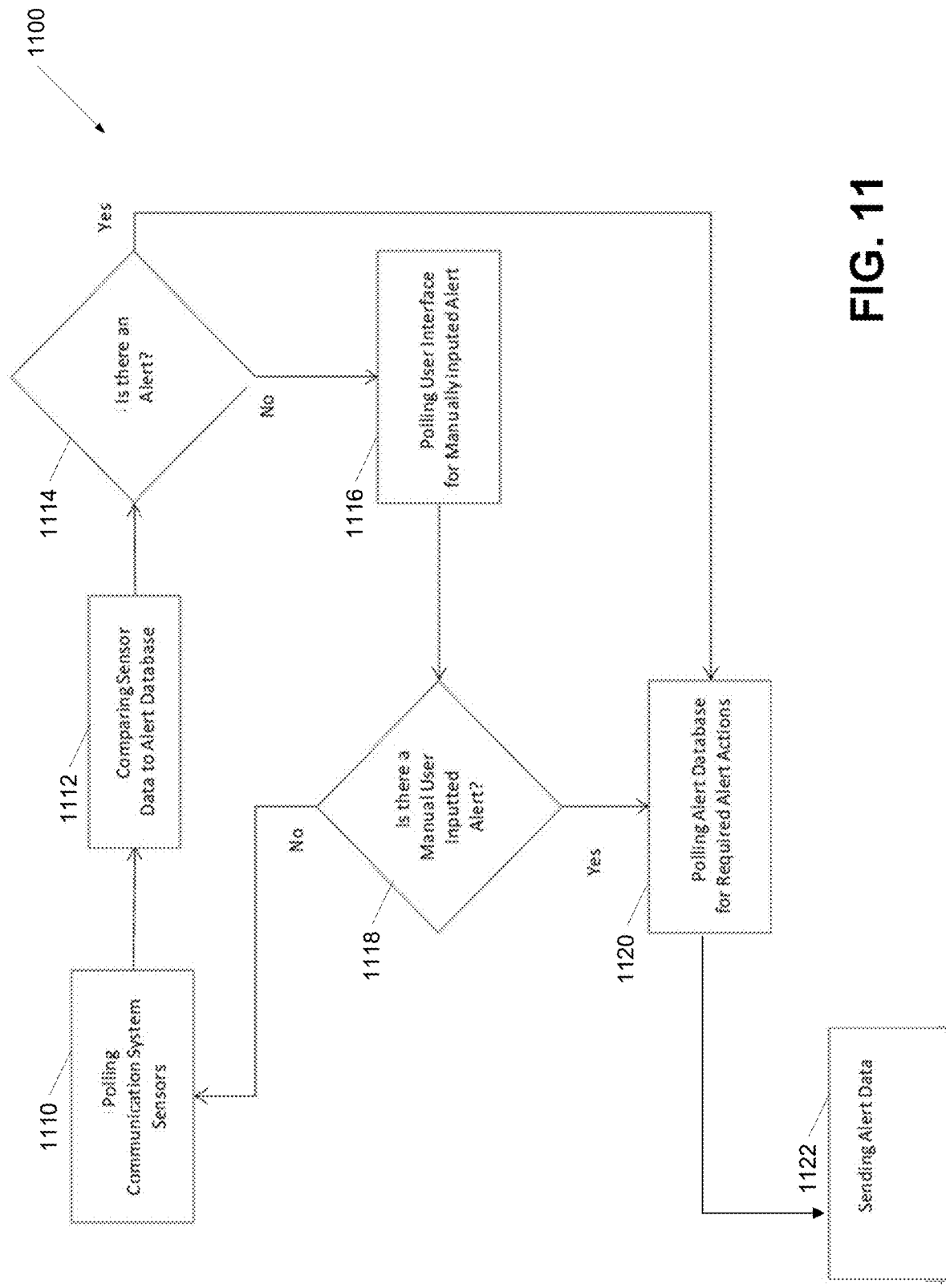

1400

| User's First Name | User's Last Name | Type of Device | Device Unique ID (i.e. MAC address) | Community |
|---|---|---|---|---|
| John | Smith | iPhone | F8-C0-BE-81-1A-76 | Building A |
| Jane | Doe | Android | AA-B5-9E-08-CF-5D | Building A, B |
| Mike | Johnson | Android | A3-7F-14-19-10-7D | Building C |
| Wendy | McDonald | iPhone | 2A-E6-29-F2-FC-AA | Building A, C |
| Ole | Farmer | iPhone | 3D-E5-B8-09-1F-08 | Building A, B, C |

FIG. 14

| Custom Preference Profile | Alert Scenario | Alert Type | Time of Day | Location |
|---|---|---|---|---|
| A | All Scenarios | Haptic, Flash Light | N/A | Library |
| B | All Except Evacuation | Haptic, Flash Light | 8am to 12 pm | Classroom |
| C | All Except Evacuation | Audio | 10pm to 6am | N/A |
| D | Evacuation | Haptic, Light, Audio, (All) | N/A | N/A |
| E | General Notice Alert | N/A | N/A | N/A |

EMERGENCY ALERT SYSTEMS WITH CUSTOMIZED ALERTS

CROSS-REFERENCE TO RELATED APPLICATIONS

The instant application claims priority to U.S. Provisional Patent Application No. 62/901,390, titled "Emergency Alert Systems" and filed Sep. 17, 2019, the disclosure of which is hereby incorporated by reference in its entirety.

FIELD OF USE

Aspects of the disclosure relate generally to communication systems and more specifically to emergency alert systems.

BACKGROUND

People use many different systems to send and receive messages with others, including individual emails, group emails, texts to mobile devices, etc. during emergency and time-sensitive events. Existing emergency alert systems like the Federal Emergency Alert System rely on people listening to a radio, television, or similar device to receive their alerts. These devices may interfere with sleep and therefore are usually turned off while people are sleeping or otherwise busy. The precision in which emergency alert systems use for transmitting alerts is further limited to existing telecommunication architecture. For example, if there were a fire in a portion of Orange County, Calif., the existing emergency alerts systems would notify the entire Los Angeles metropolitan area and portions of the surrounding counties. Alert systems utilizing mobile phones are similarly limited as they do not allow for emergency alerts to be audibly provided while the mobile phone is in a silent or do not disturb mode.

Aspects described herein may address these and other problems, and generally improve the quality, efficiency, and speed of emergency alerts by improving the ability of a system to quickly and easily identify groups of people such that these people may be quickly contacted in the event of an emergency.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Aspects discussed herein relate to communicating with a community of people determined by a geofencing system to be physically in or near a location such as a building or property, wherein the system overrides any alert-inhibiting state in the mobile devices (or any other device) to deliver audio or visual alerts in emergencies. In addition to providing emergency alerts, the present system may be used by building managers to communicate with people living or working in a building, by university administration to communicate with students or instructors on a university campus, by airport management to communicate with travelers passing through the airport, by a stadium operator to communicate with fans at a sporting game, and a variety of other uses. As may be appreciated, the present communication and emergency alert system may be used by many different groups of administrators to communicate with many different communities of people. Moreover, certain individuals may be members of more than one community at the same time, and the communities themselves may change over time based both on the user's preferences and on their physical locations. Users may set their own preferences for how alerts are provided, such as customizing the visual and/or audible notifications provided for an alert.

In one embodiment of the invention, a computer-implemented method includes obtaining an indication of an alert condition in a building, determining that the alert condition includes an emergency condition in a first portion of the building, determining a location for a plurality of mobile devices, each mobile device being associated with a community for the building, determining a distance from each mobile device to the first portion of the building, generating an alert associated with each mobile device within a threshold distance of the first potion of the building, determining, for a first mobile device within a threshold distance of the first portion of the building, user preference data associated with the first mobile device modifying the alert for the first mobile device according to the user preference data, and transmitting each alert to the associated mobile device, wherein the modified alert is transmitted to the first mobile device.

In yet another embodiment of the invention, the user preference indicates a notification type for the alert, the notification type selected from the group consisting of an audible notification, a visual notification, and a haptic notification.

In still another embodiment of the invention, the computer-implemented method further includes determining, for a second mobile device within a threshold distance of the first portion of the building, second user preference data associated with the second mobile device, wherein the second user preference data is distinct from the first user preference data, modifying the alert for the second mobile device according to the second user preference data, and transmitting the alert for the second mobile device to the second mobile device.

In yet still another additional embodiment of the invention, the computer-implemented method further includes determining that a second mobile device is located in the building and automatically adding the second mobile device to the community for the building.

In yet another additional embodiment of the invention, the computer-implemented method further includes identifying a mobile device in the plurality of mobile devices for which a location has not been determined, determining a proxy location for the mobile device, and using the proxy location for the mobile device as the location of the mobile device.

In still another additional embodiment of the invention, the computer-implemented method further includes determining a location for a second plurality of mobile devices in the community, wherein the mobile devices in the second plurality of mobile devices are outside the threshold distance of the first portion of the building, generating a second alert associated with each mobile device in the second plurality of mobile devices, and transmitting each second alert to the associated second mobile devices.

In yet still another additional embodiment of the invention, the alert for the plurality of mobile devices is associated with a first tier of alert for the alert condition and the alert for the second plurality of mobile devices is associated with a second tier of alert for the alert condition.

Yet another embodiment of the invention includes a computing device including a processor and a memory in communication with the processor and storing instructions that, when read by the processor, cause the computing device to obtain an indication of an alert condition in a building, determine that the alert condition includes an emergency condition in a first portion of the building, determine a location for a plurality of mobile devices, each mobile device being associated with a community for the building, determine a distance from each mobile device to the first portion of the building, generate an alert associated with each mobile device within a threshold distance of the first potion of the building, determine, for a first mobile device within a threshold distance of the first portion of the building, user preference data associated with the first mobile device, modify the alert for the first mobile device according to the user preference data, and transmit each alert to the associated mobile device, wherein the modified alert is transmitted to the first mobile device.

In yet another embodiment of the invention, the user preference indicates a notification type for the alert, the notification type selected from the group consisting of an audible notification, a visual notification, and a haptic notification.

In still another embodiment of the invention, the instructions, when read by the processor, further cause the computing device to determine, for a second mobile device within a threshold distance of the first portion of the building, second user preference data associated with the second mobile device, wherein the second user preference data is distinct from the first user preference data, modify the alert for the second mobile device according to the second user preference data, and transmit the alert for the second mobile device to the second mobile device.

In yet still another additional embodiment of the invention, the instructions, when read by the processor, further cause the computing device to determine that a second mobile device is located in the building and automatically add the second mobile device to the community for the building.

In yet another additional embodiment of the invention, the instructions, when read by the processor, further cause the computing device to identify a mobile device in the plurality of mobile devices for which a location has not been determined, determine a proxy location for the mobile device, and use the proxy location for the mobile device as the location of the mobile device.

In still another additional embodiment of the invention, the instructions, when read by the processor, further cause the computing device to determine a location for a second plurality of mobile devices in the community, wherein the mobile devices in the second plurality of mobile devices are outside the threshold distance of the first portion of the building, generate a second alert associated with each mobile device in the second plurality of mobile devices, and transmit each second alert to the associated second mobile devices.

In yet still another additional embodiment of the invention, the alert for the plurality of mobile devices is associated with a first tier of alert for the alert condition and the alert for the second plurality of mobile devices is associated with a second tier of alert for the alert condition.

Still another embodiment of the invention includes non-transitory machine-readable medium storing instructions that, when executed by one or more processors, cause the one or more processors to perform steps including obtaining an indication of an alert condition in a building, determining that the alert condition includes an emergency condition in a first portion of the building, determining a location for a plurality of mobile devices, each mobile device being associated with a community for the building, determining a distance from each mobile device to the first portion of the building, generating an alert associated with each mobile device within a threshold distance of the first potion of the building, determining, for a first mobile device within a threshold distance of the first portion of the building, user preference data associated with the first mobile device, modifying the alert for the first mobile device according to the user preference data, and transmitting each alert to the associated mobile device, wherein the modified alert is transmitted to the first mobile device.

In yet another embodiment of the invention, the user preference indicates a notification type for the alert, the notification type selected from the group consisting of an audible notification, a visual notification, and a haptic notification.

In still another embodiment of the invention, the instructions, when executed by one or more processors, further cause the one or more processors to perform steps including determining, for a second mobile device within a threshold distance of the first portion of the building, second user preference data associated with the second mobile device, wherein the second user preference data is distinct from the first user preference data, modifying the alert for the second mobile device according to the second user preference data, and transmitting the alert for the second mobile device to the second mobile device.

In yet still another embodiment of the invention, the instructions, when executed by one or more processors, further cause the one or more processors to perform steps including determining that a second mobile device is located in the building and automatically adding the second mobile device to the community for the building.

In yet another additional embodiment of the invention, the instructions, when executed by one or more processors, further cause the one or more processors to perform steps including determining a location for a second plurality of mobile devices in the community, wherein the mobile devices in the second plurality of mobile devices are outside the threshold distance of the first portion of the building, generating a second alert associated with each mobile device in the second plurality of mobile devices, and transmitting each second alert to the associated second mobile devices.

In still another additional embodiment of the invention, the alert for the first plurality of mobile devices is associated with a first tier of alert for the alert condition and the alert for the second plurality of mobile devices is associated with a second tier of alert for the alert condition.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 8 depicts an alert code database according to one or more aspects of the disclosure;

FIG. 10 depicts an alert database according to one or more aspects of the disclosure;

FIG. 11 depicts a flow chart for providing alerts according to one or more aspects of the disclosure;

FIG. 14 depicts a community database according to one or more aspects of the disclosure;

FIG. 19 depicts a preferences database according to one or more aspects of the disclosure.

DETAILED DESCRIPTION

Figure 1:
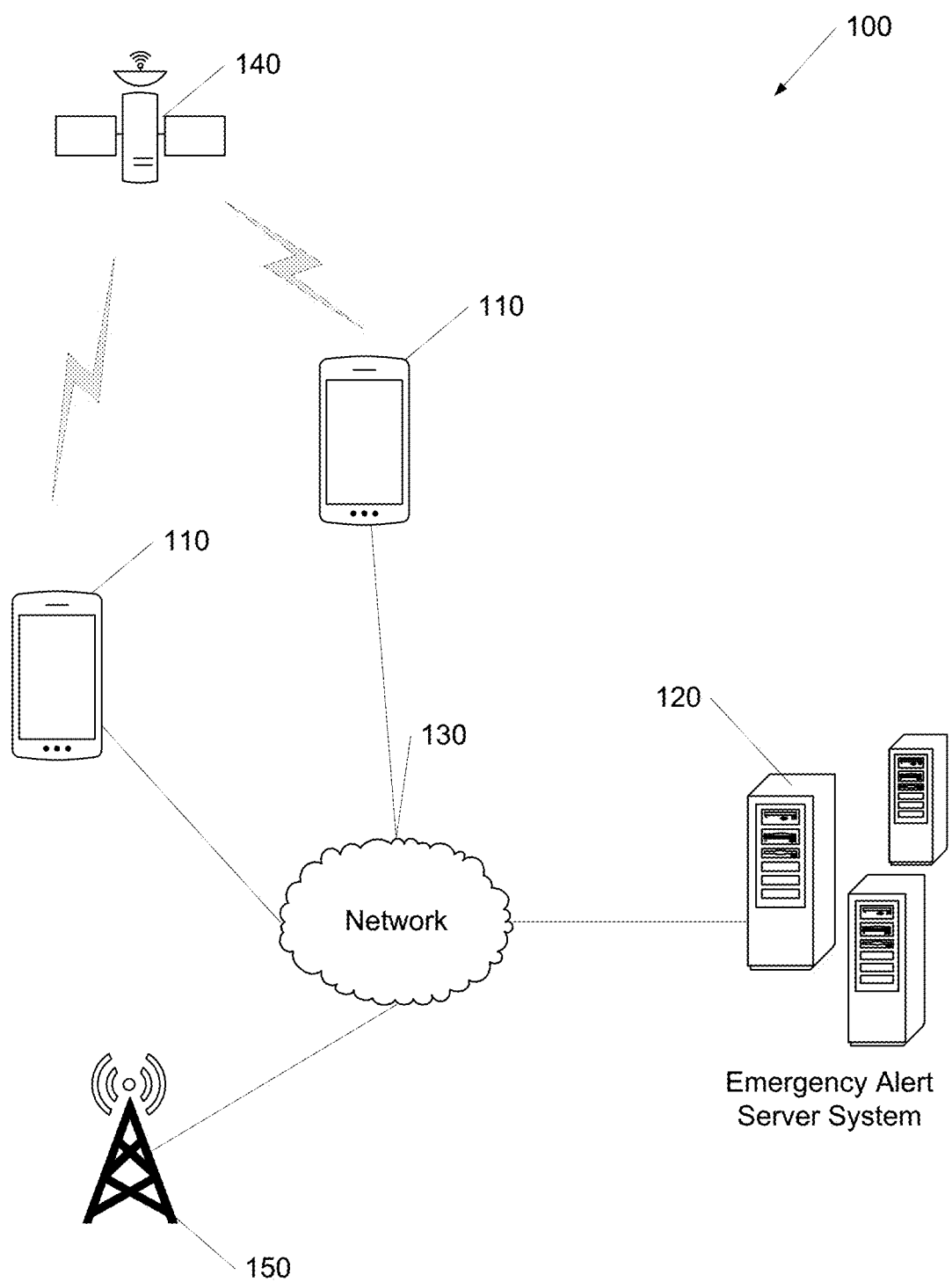
FIG. 1 illustrates an example of an emergency alert system in which one or more aspects described herein may be implemented.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

Emergency alert systems may override any alert-inhibiting state in a person's mobile device to deliver an audio or visual alert in an emergency. Emergency alert systems provide a method of communicating with members of a community by using geofencing to determine the location of users such that they may optionally be automatically added to a community. Members may be auto-subscribed into the community based on their physical locations. These subscriptions may change from time to time as the mobile device moves. Users may also be added to a community based on their own user preferences. People may be members of more than one community and the communities may change over time. A variety of systems and methods for establishing the location of a mobile device and providing alerts to the mobile device in accordance with embodiments of the invention are described in U.S. Pat. No. 10,251,023, titled "Notification and Communication System using Geofencing to Identify Members of a Community" and issued Apr. 2, 2019, the disclosure of which is hereby incorporated by reference in its entirety.

For example, emergency alert systems in accordance with embodiments of the invention can communicate with members of a community by using geofencing to determine the location of users such that they can optionally be automatically added to a community. As such, members may be auto-subscribed into the community based on their physical locations (which may change from time to time). Members or users can also be added to the community based on their own user preferences. People can be members of more than one community and the communities can change over time. Geofencing systems can be used to determine whether a particular mobile device is physically present in a geographic region or area or range (for example, in a building or on a property) based upon the physical location of the smartphone. If the user's phone is determined to be on the property, the user's phone can be automatically added to the property community. In cases where the mobile device is determined not to be physically present on the property (e.g. not detected by proximity sensors in the location), the user can be provided with the option of voluntarily subscribing to join the community. In this way, interested users (e.g.: building tenants who are away at work, or persons working at different jobsites) can be kept informed of developments and alerts with regard to a particular property community even when they are physically away from that property.

Emergency alert systems determine the "alert state" of each of the individuals' smart devices. This can be accomplished by sending a signal to the user's mobile device to determine if the "silent" or "do not disturb" setting is on. If the mobile device setting is alert-enabled (e.g. the "do not disturb" or "silent" function is not turned on), then the mobile device is ready to receive alert messages at step 210. However, in those cases where the mobile device is not alert-enabled (e.g. the "do not disturb" or "silent" function is turned on), then one of two options is possible. First, the user can be sent a message asking if the alert setting can be switched to alert-enabled. Should the user agree and grant permission, then the alert enabled setting is enabled (e.g. the "do not disturb" or "silent" function is overridden). Alternatively, the present system may instead automatically override the "do not disturb" or "silent" function, thereby enabling the mobile device to receive alerts and communications from the emergency alert system irrespective of the "do not disturb" or "silent" function. As such, an important advantage of the present system is that it can be prioritized over typical email, text, and notification traffic, even when the user's phone is set on silent, and warn building or property occupants in the event of an emergency situation such as a fire, crime, or medical emergency.

In addition to sending safety alerts, emergency alert systems can send property-specific (and/or interest group-specific) messages and non-property-specific messages (e.g. messages appealing to more than one property or interest group-specific group). The property-specific messages and the non-property-specific messages may be sent with the smartphone's "do not disturb" or "silent" function overridden and turned off. However, the more likely desired setting may be having the property-specific messages and non-property-specific messages subject to the smartphone's "do not disturb" or "silent" settings. Emergency alert systems can be configured such that only safety alert messages will override the smartphone's "do not disturb" or "silent" settings while other messages (e.g.: building advertisements/messages) will not override the smartphone's "do not disturb" or "silent" settings. The settings used can optionally be set by members of the community themselves, either by the manager or administrator of the community, or both. This is desirable such that users/community members receive safety alerts such as "fire" or "active shooter in the building" without such messages being silenced, but are able to block, silence, or turn off messages like "lunch specials in the building's cafe." In preferred aspects, such advertising may be targeted and, for example, by being tailored to businesses within a 2 to 3 block radius around building. Moreover, when the user/community member first registers with the present system, they can be asked a series of questions to better target the advertising to their desires in addition to their location.

FIG. 1 illustrates an emergency alert system 100 in accordance with an embodiment of the invention. The emergency alert system 100 includes at least one client device 110 and/or at least one emergency alert server system 120 in communication via a network 130. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing devices described with respect to FIG. 2.

Client devices 110 may provide data to and/or obtain data from the at least one emergency alert server system 120 as described herein. The client devices may determine their geographic location using a variety of location-determination techniques, including receiving positioning signals from positioning system satellites 140, cellular tower triangulation, WiFi positioning systems, geocoding systems, and the like. Emergency alert server systems 120 may store and process a variety of data as described herein. The network 130 may include a local area network (LAN), a wide area network (WAN), a wireless telecommunications network, and/or any other communication network or combination thereof.

The emergency alert system may also include a variety of virtual border transmitters 150. Virtual border transmitters may broadcast a signal that is capable of determining when an object, such as a person, mobile device, vehicle, and the like, enters or crosses a particular geographic location. The virtual border transmitter may be able to determine its own location via a variety of technologies, such as via GPS, and/or be pre-programmed to know its location. In this way, the virtual border transmitter may be used to create a virtual fence around a particular geographic area. In several embodiments, a number of virtual border transmitters are installed in a specific geographic region to create a virtual border around a particular geographic region. In many embodiments, a virtual border transmitter is installed in a vehicle (or other moving object) that may detect movement in an area surrounding the vehicle. In this way, specific geofenced areas may be created, either in fixed locations or in moving locations.

Some or all of the data described herein may be stored using any of a variety of data storage mechanisms, such as databases. These databases may include, but are not limited to relational databases, hierarchical databases, distributed databases, in-memory databases, flat file databases, XML databases, NoSQL databases, graph databases, and/or a combination thereof. The data transferred to and from various computing devices in the emergency alert system 100 may include secure and sensitive data, such as confidential documents, customer personally identifiable information, and account data. It may be desirable to protect transmissions of such data using secure network protocols and encryption and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the emergency alert system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the emergency alert system 100 in front of one or more computing devices such that any external devices may communicate directly with the specialized hardware.

Figure 2:
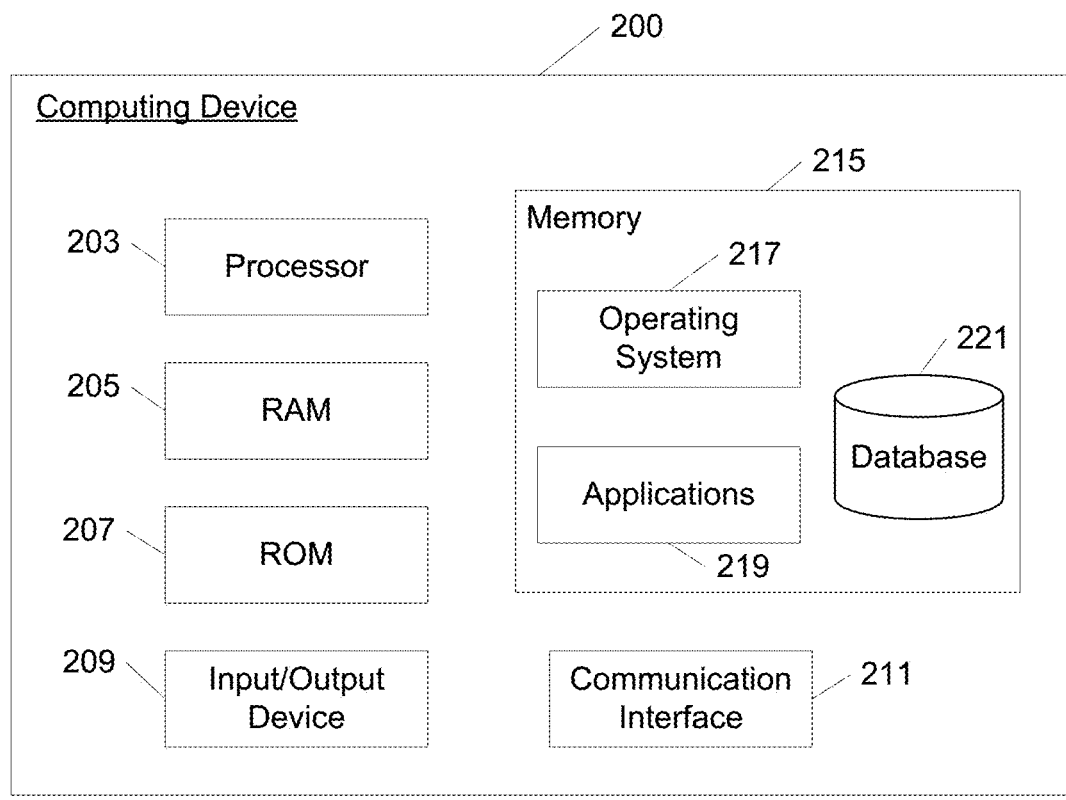
FIG. 2 illustrates an example computing device in accordance with one or more aspects described herein.

Turning now to FIG. 2, a computing device 200 in accordance with an embodiment of the invention is shown. The computing device 200 may include a processor 203 for controlling overall operation of the computing device 200 and its associated components, including RAM 205, ROM 207, input/output device 209, communication interface 211, and/or memory 215. A data bus may interconnect processor (s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Communication interface 211 may include one or more transceivers, digital signal processors, and/or additional circuitry and software for communicating via any network, wired or wireless, using any protocol as described herein. Software may be stored within memory 215 to provide instructions to processor 203 allowing computing device 200 to perform various actions. For example, memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches, for example, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Emergency alert system can override any alert-inhibiting state in a person's mobile device to deliver an audio or visual alert in an emergency situation. Members of a community can be determined by using geofencing to determine the location of users such that they can optionally be automatically added to a community. As such, members may be auto-subscribed into the community based on their physical locations, which may change from time to time. Members or users can also be added to the community based on their own user preferences. People can be members of more than one community and the communities can change over time.

Figure 3:
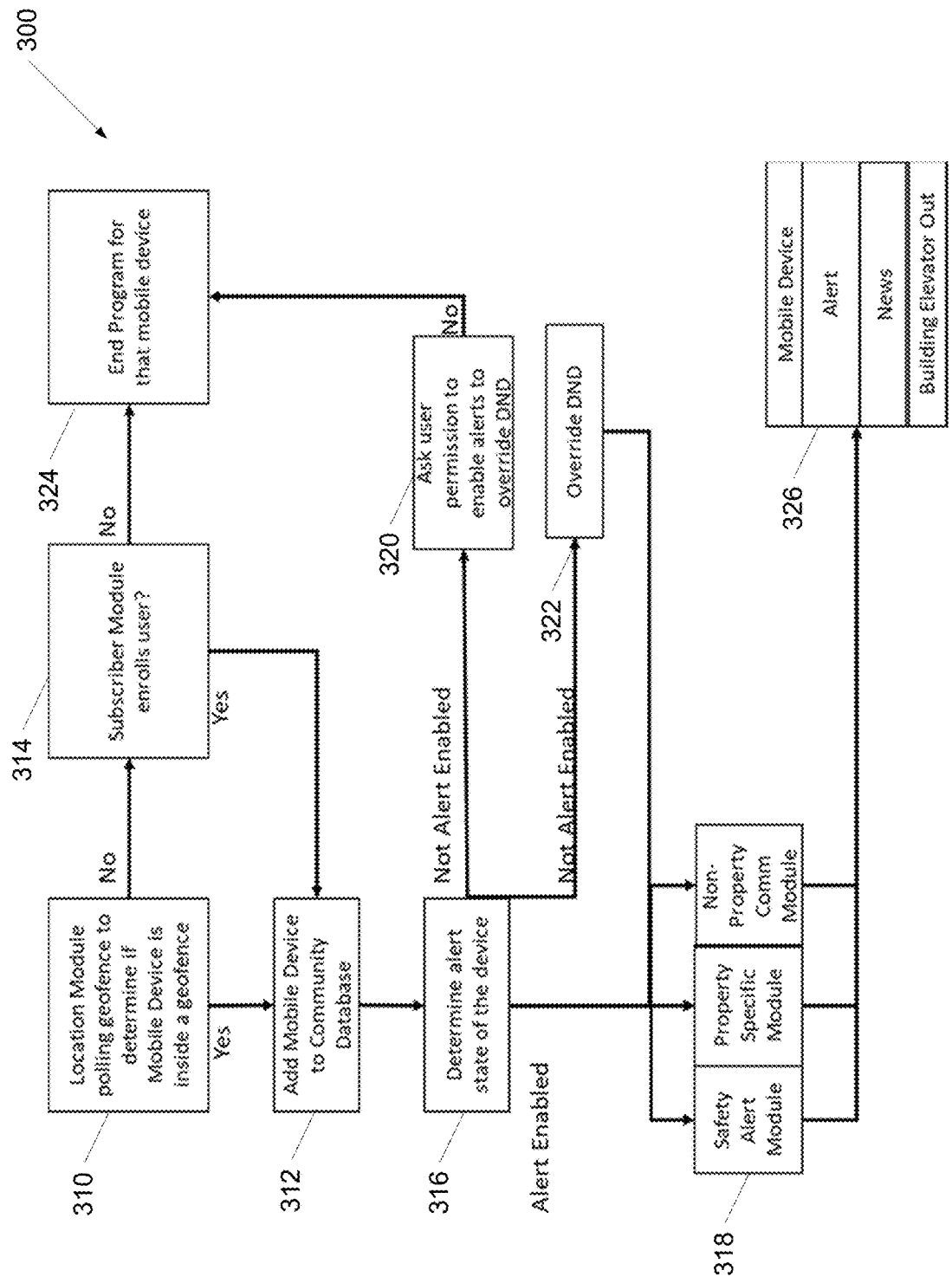
FIG. 3 illustrates a process for providing an emergency alert in accordance with one or more aspects described herein.

FIG. 3 illustrates a process for providing an emergency alerts to members of a community in accordance with one or more aspects described herein. Some or all of the steps of process 300 may be performed using any of the computing devices and/or combination thereof described herein. In a variety of embodiments, some or all of the steps described below may be combined and/or divided into sub-steps as appropriate.

At step 310, it can be determined if a mobile device is located within a particular region. For example, an emergency alert server system, using a geofencing and/or GPS systems, can determine whether a mobile device associated with a particular user is physically present in a geographic region or area or range (e.g. In a building or on a property) based upon the physical location of the mobile device. In several embodiments, the physical location of the mobile device can be determined based on a GPS location augmented using one or more beacons located in the geographic region. At step 312, if the user's mobile device is determined to be on the property, the user's mobile device can be automatically added to a community database. In several embodiments, the mobile device can be added to the community database by the emergency alert server system. At step 314, in cases where the user's mobile device is determined not to be physically present on the property (e.g. not detected by proximity sensors), the user can be provided with the option of voluntarily subscribing to join the community (e.g. enter the user's mobile device into the community database) by providing a subscription request on the mobile device. In this way, interested users (e.g. building tenants who are away at work, persons working at different job sites, and the like) can be kept informed of developments and alerts with regard to a particular property community even when they are physically away from that property. If the mobile device does not subscribe to the community, the process can end at step 324.

At step 316, the alert state of each of the subscribed user's mobile devices can be determined. This can be accomplished by sending a signal to the mobile device to determine if the mobile device's "silent" or "do not disturb" setting is on. If the mobile device setting is alert-enabled (e.g. the "do not disturb" or "silent" function is not turned on), then the mobile device is ready to receive alert messages. However, in those cases where the mobile device is not alert-enabled (e.g. the "do not disturb" or "silent" function is turned on), then one of two options is possible. First, at step 320, a message can be sent to the user asking if the alert setting can be switched to alert-enabled. Should the user agree and grant permission, then the alert enabled setting is enabled (e.g. the "do not disturb" or "silent" function is overridden). If the user does not agree to set the mobile device to an alert-enabled state, the process can end at step 324. Second, at step 322, the system may instead proceed directly to automatically override the "do not disturb" or "silent" function, thereby enabling the mobile device to receive alerts and communications from system.

At step 318, a variety of messages can be sent using the emergency alert server system. In addition to sending safety alerts through the safety alert module, the emergency alert server system also can send property-specific (or interest group-specific) messages using the property specific module and non-property-specific messages (e.g. Messages appealing to more than one property or interest group-specific group) using the non-property communication module. In various embodiments of the system, the property-specific messages sent by the property specific module and the non-property-specific messages sent by the non-property communication module may be sent with the "do not disturb" or "silent" function (e.g. an alert-inhibiting setting) of the mobile device overridden and turned off. However, the more likely desired setting may be to have the property-specific messages sent by the property specific module and non-property-specific messages sent by the non-property communication module are subject to the "do not disturb" or "silent" settings of the mobile device. In such a case, the emergency alert system can be configured such that only safety alert messages will override the "do not disturb" or "silent" settings of the mobile device, while other messages (e.g. Building advertisements and/or messages) will not override the "do not disturb" or "silent" settings. The settings used can optionally be set by members of the community themselves, by the manager or administrator of the community, or both. This is desirable such that users/community members receive safety alerts such as "fire" or "active shooter in the building" without such messages being silenced, but can block, silence, or turn off messages like "lunch specials in the building's café." These various alerts can be provided via the mobile device in step 326. The alerts may be provided using any audible, visual, and/or haptic notifications indicated in the alert.

Mobile device users can create customized modifiers to alerts delivered to their mobile device based upon the context of the alert. For example, a user can designate a geolocation in which all alerts, regardless of their description in the alert database, are delivered without sound, such as in the user's church. Contextual alert delivery modifications can be based on several different contextual factors, such as the community the alert comes from, the role(s) is it delivered to, the type of notifications indicated in the alert, and the like. For example, a user can customize the tone for alerts that originate from two different communities, such as the user's primary employer and a first responder community, so that the user can quickly identify the community from which an alert originated without looking at their mobile device. In a second example, the user can customize aspects of the alert notification if an alert is directed solely to their role in a community, such as a first vibration pattern for general alerts, a sound alert for facilities-based alerts, and a second vibration pattern for alerts directed to those community members for which they are directly responsible. The user notification preferences can be stored using an alert code database. The alert code database stores user preferences for context-based modification of the characteristics of alerts being delivered to the mobile device. In a variety of embodiments, the user preferences modify notifications provided by alerts that are provided through a do not disturb function of the mobile device. The alert database can include one row for each context feature, such as geolocation, the community the alert originated from, and/or the role(s) the alert is directed to. The user preferences can define a notification characteristic for each type of notification in an alert, such as the volume, sound, display, haptics, etc., that a user wishes to customize based on the selected context. The alerts can be defined for a user and/or any mobile device associated with a user. For example, the user can define a geofence around their child's school, inside of which no alert can be delivered at greater than 10% volume. Alerts being delivered to the mobile device can be monitored and compared to the current geolocation of the mobile device and/or other context features of the alert to the rules in the alert code database in order to determine if any of the notification characteristics need to be modified, such as the user wanting a customized sound for all alerts directed to their role in the community and/or muting all alerts delivered inside of a geolocation defined by the user.

The emergency alert server system can obtain, depending upon the alert condition, a user response to the delivered alert. The user response can include an indication that the user viewed the alert. In many embodiments, the user having viewed the alert can be indicated by the user having interacted with their mobile device after the alert was delivered to and/or displayed by an emergency alert application executing on the mobile device, where the emergency alert application can display one or more notifications indicated in the alert by overriding any alert-inhibiting state of the mobile device as described herein. The user response can include any responses to prompts and/or questions provided in the alert, such as a request for additional information about an alert condition, the user's response to the alert condition, and the like.

Figure 4:
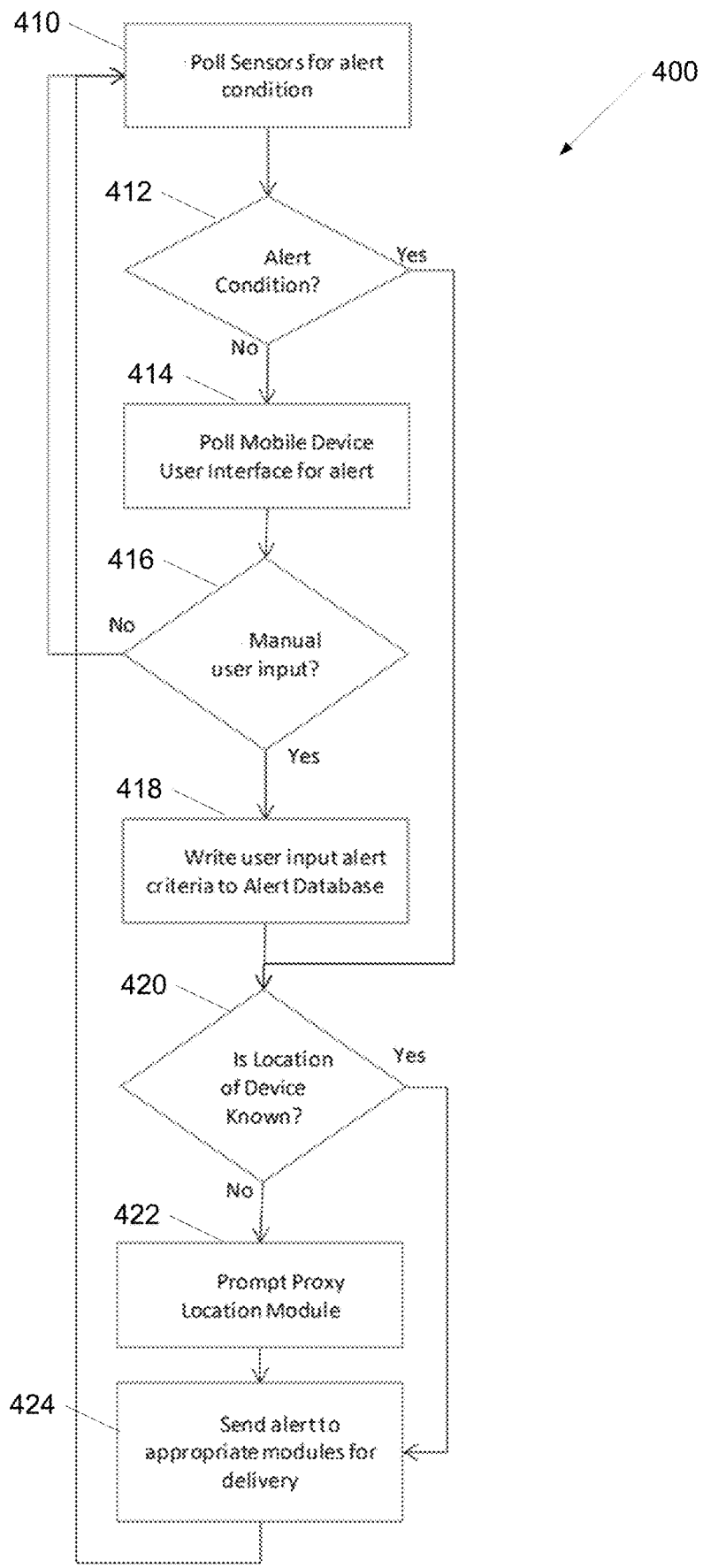
FIG. 4 depicts a flow chart for providing alerts according to one or more aspects of the disclosure.

FIG. 4 depicts a flow chart for determining an alert condition according to one or more aspects of the disclosure. Some or all of the steps of process 400 may be performed using any of the computing devices and/or combination thereof described herein. In a variety of embodiments, some or all of the steps described below may be combined and/or divided into sub-steps as appropriate.

At step 410, an emergency alert server system can obtain sensor data from one or more sensors. The sensors can include, but are not limited to, a variety of devices capable of detecting an alert condition such as fire alarms, smoke detectors, water sensors, occupancy sensors, equipment monitoring sensors, and the like. The sensors can be associated with a specific geographic location and/or location within a building as appropriate. At step 412, the emergency alert server system can determine if an alert condition is present based upon the sensor data. If alarm conditions are present in the sensor data, the process can proceed to step 420. If the sensor data does not indicate an alert condition at step 412, the process can proceed to step 414. At step 414, the emergency alert server system can obtain a user input of an alert condition from one or more mobile devices in a network of authorized mobile devices. The user-provided alert condition can indicate a suspicious and/or dangerous condition along with a location at which the condition was observed. At step 416, if a user-provided alert condition has not been provided, the process can return to step 410. If a user-provided alert condition has been provided at step 416, the emergency alert server system can store the user-defined alert criteria using an alert database at step 418. At step 420, the emergency alert server system can determine if the location of the mobile device to receive an alert is known. The emergency alert server system can determine the location of a mobile device using any of a variety of location-determination techniques, such as GPS location, as described herein. The mobile device to receive the alert can be determined based on the sensor data, alert condition, location of the alert, location of the mobile device, and/or a variety of other criteria as appropriate. If the location of the mobile device is known, the process can proceed to step 424. If the location of the mobile device is not known, a proxy location of the mobile device can be determined at step 422. A proxy location may include a location of a device having a known location that is associated with the mobile device. For example, the mobile device may be associated with an access device on a door and the location of the access device can be used as the proxy location for the mobile device. In a second example, if a mobile device is connected to a wireless access point, the location of the wireless access point can be used as the proxy location for the mobile device. A known device database that can be used to determine proxy locations is described in more detail with respect to FIG. 5. At step 424, the emergency alert server system can transmit the alert to the appropriate mobile device.

Figure 5:
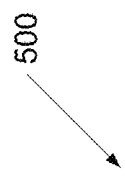
FIG. 5 depicts a known device database according to one or more aspects of the disclosure.

FIG. 5 depicts a known device database according to one or more aspects of the disclosure. The database 500 contains one or more devices that may be used to determine a proxy location when the mobile device is connected to the device. For example, a WiFi router in the user's home would indicate the user is located in their home when the mobile device is connected to that router. The system can determine the user is at home and may use the router as a means of delivering the alert message to the mobile device in an alternate and/or additional pathway to a cellular network. The known device database 500 contains an ID for each known device, an indication of the type of the device, a geolocation associated with the device, and/or an indication of if the device can be used as a delivery path for an alert. The geolocation of the device can be based on an effective range of the device. For example, a diameter of the WiFi range around a WiFi router, the user's property boundary, and/or other boundaries can be specified as the geolocation data. In a variety of embodiments, a WiFi router can send an alert to the mobile device if the mobile device is not in range of a cellular tower. Similarly, a point of sale device (POS) that is connected by NFC to the user's mobile device is likely not able to be used as an alternative deliver path for the message.

A variety of sensors can be monitored for sensor data, such as a fire detected, and an emergency alert server system can generate an appropriate class of alert (e.g. Emergency, property-specific, and/or non-property communication) for delivery to one or more mobile devices corresponding to the detected alert condition in an alert database. If no data corresponding to an alert condition is detected by one or more sensors, the emergency alert server system can obtain a user inputted alert condition to be delivered via the appropriate delivery module. If no alert condition is detected by the sensors or input by a user, the emergency alert server system can continue to monitor the sensors. The alert database contains the alert characteristics, such as the messaging, sounds, display, haptics, etc., as well as the community and role(s) within that community that is to receive the alert when the alert condition is detected by sensors or input by a user. For example, a when fire detected by a sensor in a given location, that alert condition can be associated with an evacuation message along with a siren type sound at max volume for 5 second bursts and a specified vibration pattern, to be displayed on the indicated mobile devices that are in any community and/or within a geofence indicating the building around the fire sensor. Multiple alerts may also be generated and provided by the emergency alert server system. For example, in addition to sending an alert to each mobile device in the same geographic area as the building, an alert can also be sent to administrators in the community associated with ownership of the building regardless of the location of the associated mobile devices.

Mobile device users can create customized modifiers to alerts delivered to their mobile device based upon the context of the alert. These customized alerts can be stored using the alert database. For example, a user may designate a geolocation in which all alerts, regardless of their description in the alert database, are delivered without sound, such as in the user's church. Contextual alert deliver modifications can be based on several different contextual factors, such as the community the alert comes from and the role(s) is it delivered to, along with any combination of factors. For example, a user may customize the tone for alerts that originate from two different communities, such as the user's primary employer and a first responder community. In another example, the user could customize aspects of the alert notifications if an alert is directed solely to their role in the community, such as one vibration pattern for general alerts, another for facilities-based alerts and a combined audible and visual notification for alerts directed to those community members for which they are directly responsible. Mobile devices can be provided to the emergency alert server system for storage in the alert code database.

The alert code database stores the user preferences for context-based modification of the characteristics of alerts being delivered to the mobile device through the device's do not disturb function. In several embodiments, the alert code database contains one row for each context feature, such as geolocation, the community the alert originated from and the role(s) the alert is directed to. Each alert characteristic (e.g. notifications associated with an alert), such as the volume, sound, display, haptics, etc., can be customized based on the selected context. For example, the user may define a geofence around their child's school, inside of which no alert may be delivered at greater than 10% volume. Alerts being delivered to the mobile device can be monitored and compared to the mobile device's current geolocation and other context features of the alert to the rules in the alert code database in order to determine if any of the alert characteristics need to be modified, such as the user wanting a customized sound for all alerts directed to their role in the community, or muting all alerts delivered inside of a geolocation defined by the user. In many embodiments, the alert is modified by the emergency alert server system prior to sending the alert to the mobile device. The modified alert can be provided to the mobile device such that the mobile device provides notifications indicated in the alert according to the user preferences for the alert and the mobile device.

Figure 6:
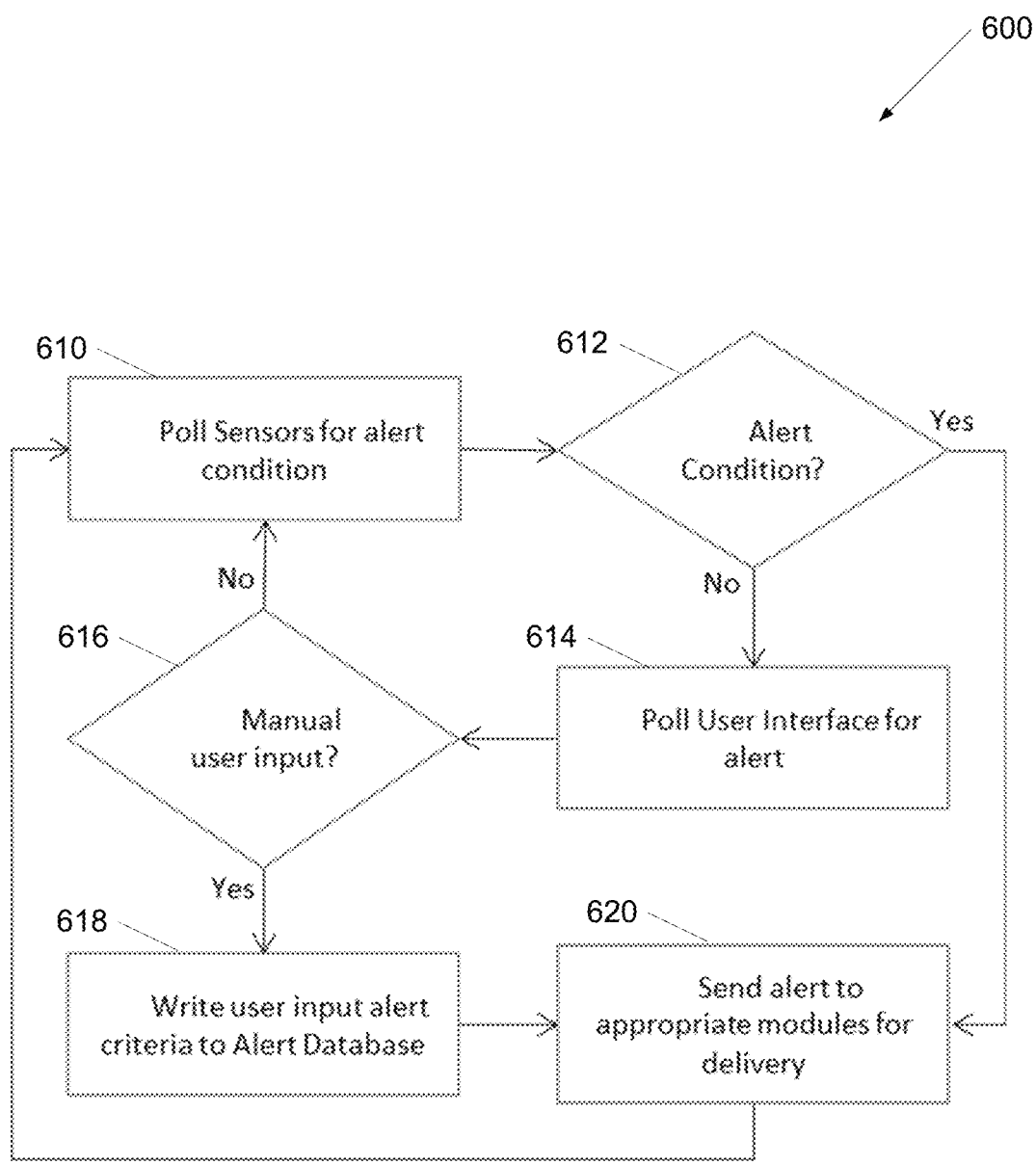
FIG. 6 depicts a flow chart for providing alerts according to one or more aspects of the disclosure.

FIG. 6 depicts a flow chart for providing alerts according to one or more aspects of the disclosure. Some or all of the steps of process 600 may be performed using any of the computing devices and/or combination thereof described herein. In a variety of embodiments, some or all of the steps described below may be combined and/or divided into sub-steps as appropriate.

At step 610, an emergency alert server system can obtain sensor data from one or more sensors as described herein. At step 612, the emergency alert server system can determine if an alert condition is present based upon the sensor data. If alert conditions are present in the sensor data, the process proceeds to step 620. If the sensor data does not indicate an alert condition, the emergency alert server system can obtain and/or request a user-provided alert from a network of authorized mobile devices at step 614. At step 616, if a user-provided alert is obtained, the emergency alert server system can store the user-provided alert in an alert database at step 618. At step 620, the emergency alert server system can transmit the alert to the appropriate mobile devices using any of a variety of communication channels as described herein. The mobile devices can provide one or more notifications indicated in the alert according to the user preferences for the class of alert as described herein.

Figure 7:
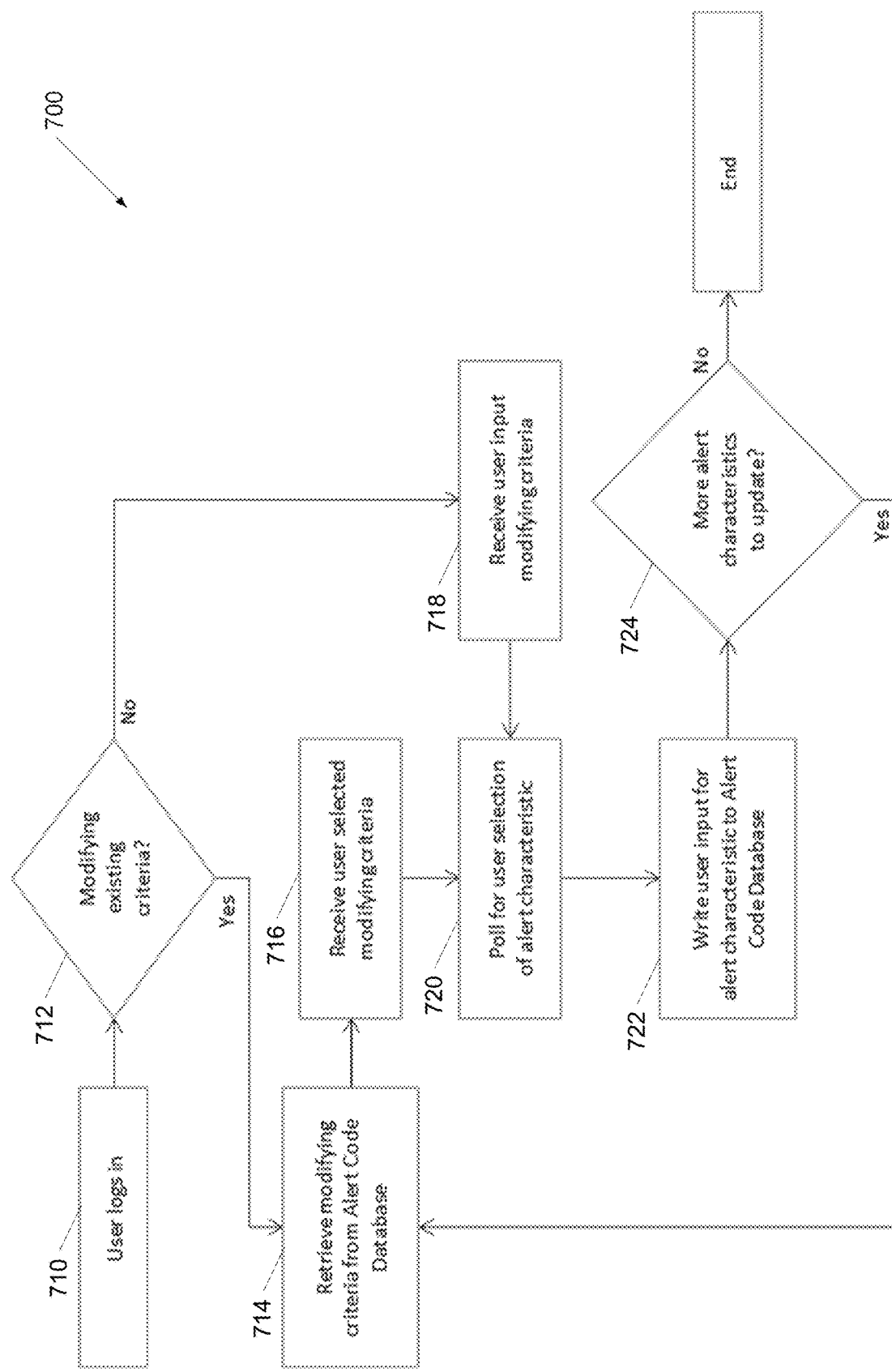
FIG. 7 depicts a flow chart for providing user preferences for alerts according to one or more aspects of the disclosure.

FIG. 7 depicts a flow chart for providing user preferences for alerts according to one or more aspects of the disclosure. Some or all of the steps of process 700 may be performed using any of the computing devices and/or combination thereof described herein. In a variety of embodiments, some or all of the steps described below may be combined and/or divided into sub-steps as appropriate.

At step 710, a user can log into a service provided by an emergency alert server system. At step 712, the user can indicate if they are modifying existing user preference stored in an alert code database and/or adding new alert preferences. If the user is creating a new user preference, the process moves to step 718. If the user is modifying an existing preference in the alert code database, the appropriate user preferences can be obtained from the alert code database at step 714. At step 716, the emergency alert server system can receive the user modifying criteria selection, such as a geofence around the user's house, work, place of worship, the communities and roles the user occupies, etc. At step 718, when the user is creating a new user preference, the provided preferences can be stored using a new row in the alert code database.

At step 720, once the user has selected an existing modifying criterion or creating a new one, the user selects which alert characteristic they wish to modify. If the user is modifying existing alert characteristics in the alert code database, then those alert characteristics are retrieved and displayed for the user. When the user finishes inputting their desired criteria, such as muting all alerts that are delivered when the user is within the geofence of their church, or a unique tone for all alerts related to their role as a first responder, etc., the user preferences can be stored using the alert code database at step 722. At step 724, if the user has more edits or additions they wish to make, the process can return to step 714. If the user has no more edits or additions to make, the process ends.

FIG. 8 depicts an alert code database according to one or more aspects of the disclosure. The database 800 contains a column for each alert characteristic (e.g. notifications that can be provided by a mobile device receiving the alert). Alert characteristics can include, but are not limited to, text to be displayed, sound(s) to be played and/or a volume at which to play sounds, a vibration pattern used to provide haptic feedback, a visual display (provided using the screen of the mobile device and/or with other parts of the mobile device, such as the flash), a timing of the alert to be delivered, such as an initial alarm for 10 seconds and repeated every 10 seconds until an acknowledgment is received, the geographic region in which the alert should be provided, one or more communities to which the alert is to be provided, the role(s) to which the alert should be provided, and the like. Each row in the table can correspond to an alert such that, when the alert is combined with the column labels, the appropriate notifications can be provided in the generated alert. In a variety of embodiments, the rows store user preferences for alerts in addition to default preferences for the alerts such that, if a user has not customized their alerts, a generic alert can be generated. The generated alerts can be provided to mobile devices for display as indicated by the preferences stored in the alert code database as described herein.

Figure 9:
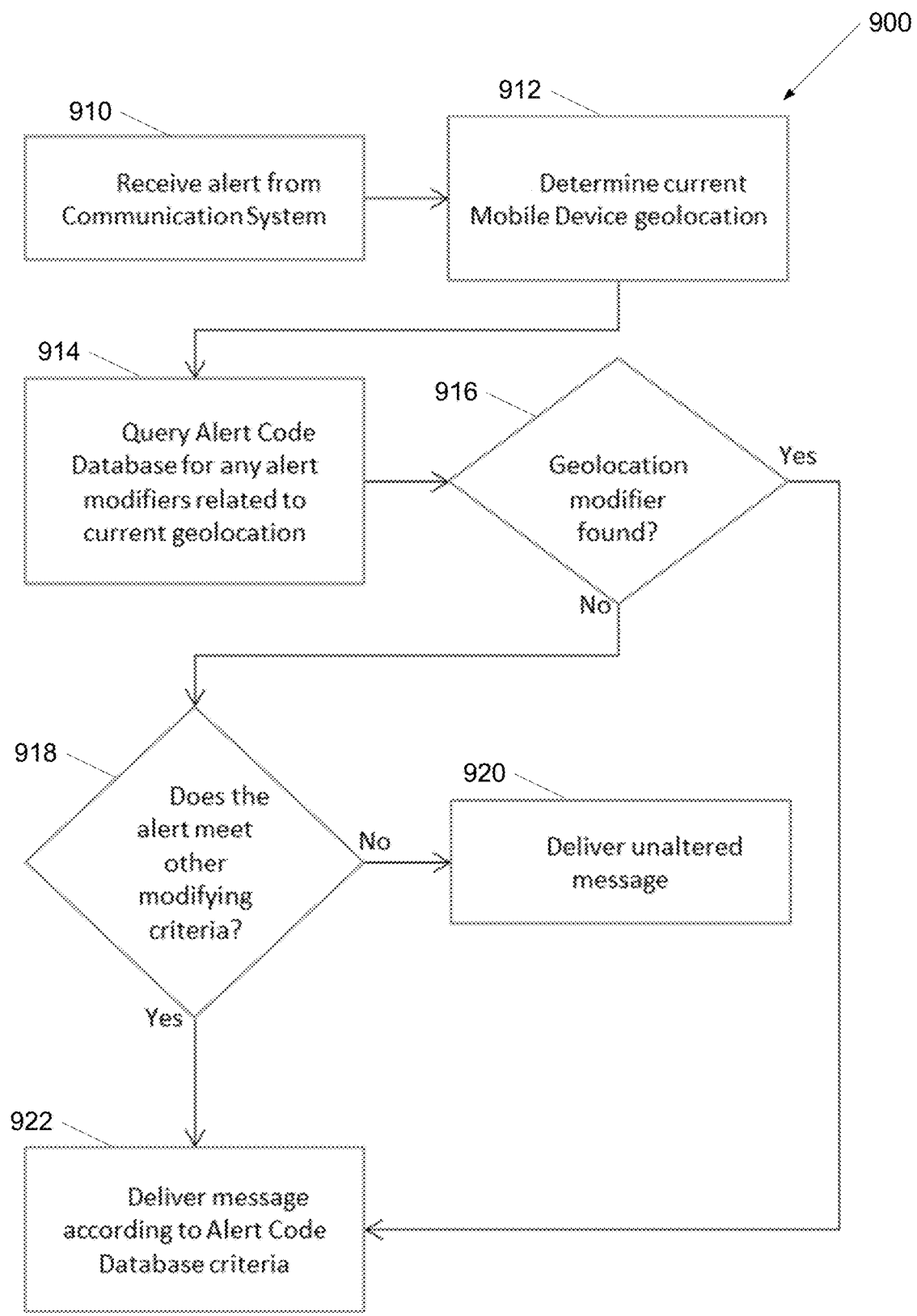
FIG. 9 depicts a flow chart for modifying alerts according to one or more aspects of the disclosure.

FIG. 9 depicts a flow chart for modifying alerts according to one or more aspects of the disclosure. Some or all of the steps of process 900 may be performed using any of the computing devices and/or combination thereof described herein. In a variety of embodiments, some or all of the steps described below may be combined and/or divided into sub-steps as appropriate.

At step 910, a mobile device and/or an emergency alert server system can receive an alert. At step 912, the current location of the mobile device can be determined. The location of the mobile device can be determined based on a location service, such as GPS, to identify the location of the mobile device directly and/or a proxy location (e.g. the location of a device associated with the mobile device) can be used as appropriate. At step 914, the emergency alert server system can query the alert code database for any alert modifying criteria related to the current location of the mobile device. At step 916, if the alert code database includes a current geolocation modification, the process can proceed to step 922. If the current geolocation does not have a modifier, it can be determined if there are any additional alert modifying criteria that apply to the current alert at step 918. If no alert modifying criteria are found, the message is delivered unaltered at step 920. If any modifying criteria are found in the alert code database, the alert is delivered according to the modified criteria at step 922. For example, when the mobile device is at a second geographic location, the alert can be modified to not display a text message and change the max volume of the alert tone to 10%. The alert can be modified by the emergency alert server system prior to transmitting the alert to the mobile device and/or by the mobile device prior to displaying the notifications indicated in the alert as appropriate.

An alert database may store types of alerts and any associated action if any action is required. Different levels of alerts may be stored in the alert database such as, but not limited to, an emergency alert to non-emergency general information messages. Each alert may have different actions, parameters, and/or types of alerts to be sent associated with it. An emergency alert server system can obtain sensor data from a variety of sensors along with user-defined alerts from a variety of mobile devices. When the obtained sensor data and/or user defined alerts indicate an alert condition, a corresponding alert can be identified in the alert database to determine appropriate alert messaging and/or notifications for the alert. The alert can be generated and transmitted to the appropriate mobile devices corresponding to the relevant parties identified in the alert. The emergency alert server system can update the location of all mobile devices subscribed to a community to ensure that the location of devices is up to date if alerts or type of alert is based on the location of a device.

Alerts may be tiered (e.g. have a priority level associated with the alert) that define the severity of the alert and/or the appropriate communities/roles to which the alert should be provided. The emergency alert server system can send out alerts General alerts, such as a fire alarm, can be sent to all mobile devices in a particular geographic area associated with the fire alarm. For example, when evacuating a building due to a fire alarm, a first tier of alert can include providing each mobile device with an alert that indicates an appropriate exit route generated based on the location of the mobile device within the building. Additionally, a second tier of alert can be provided to a fire department community indicating that one or more fire trucks should be deployed to the building. A tier may be determined by the type of alert and stored in the alert database. Tiers may be based on any number of variables such as, but not limited to, the location of the user, the user's role or position, the level of the user's subscription, and/or the level of settings selected by the user. For example, an alert can be generated for an isolated incident such as a suspicious package left in a certain location of a building. Different tiers of alerts can be provided to mobile devices based on the distance from the suspicious package to the mobile device. Mobile devices within closer proximity would get an audio, visual, haptic, and text alert to get their immediate attention, while users further away would get few or less in intrusive alerts.

FIG. 10 depicts an alert code database according to one or more aspects of the disclosure. The database 1000 contains different types of alerts and the required actions for each alert. The alert database stores a variety of alerts for specific applications of the invention. For example, if the emergency alert server system is monitoring a building, such as a school or an office, the alerts would be specifically programmed appropriately. Furthermore, the alert database also contains data regarding the messaging, type of alert to be sent (e.g. emergency and/or non-emergency), if the alert is a general alert for the whole community, a specific place in a location, and/or specific aspect of community member (e.g. location, position, title, etc.) along the type of alert (e.g. text, haptic, visual, video, audio, voice, etc.). In a variety of embodiments, the alert code database includes a tier indication for a specific alert. In many embodiments, the emergency alert server system obtains an identification of an alert type and a tier indication and uses the alert type and tier to automatically generate one or more alerts to be transmitted to one or more mobile devices associated with locations, communities, and or community roles as indicated in the alerts.

FIG. 11 depicts a flow chart for transmitting alerts according to one or more aspects of the disclosure. Some or all of the steps of process 1100 may be performed using any of the computing devices and/or combination thereof described herein. In a variety of embodiments, some or all of the steps described below may be combined and/or divided into sub-steps as appropriate.

At step 1110, the emergency alert server system can obtain sensor data from one or more sensors. The sensors may be any type of sensor, for example, sensors related to a building may include alarm systems both security and fire alarms, smoke detectors, HVAC sensors, equipment sensors, and/or any other sensor as appropriate. The sensor data can indicate one or more alert conditions. For example, a smoke or fire detector may produce an alert signal if it detects smoke or fire. At step 1112, the emergency alert server system can compare the sensor data to the alert database to identify any alerts associated with sensor data. At step 1114, if there are one or more matching alerts, the process can proceed to step 1120. At step 1114, if there is no matching data or there is not alert from the sensors, a user-defined alert can be requested and/or obtained at step 1116. At step 1118, if user-defined alert is provided, the process can proceed to step 1120. If a user-provided alert is not provided at step 1118, the process can end and/or return to step 1110.

At step 1120, data associated with the alert condition, determined based on sensor data and/or provided by one or more mobile devices, can be obtained from the alert database. One or more alerts can be generated for different tiers of mobile devices as indicated in the alert database. At step 1122, the emergency alert server system can transmit the generated alerts to the appropriate mobile devices.

Figure 12:
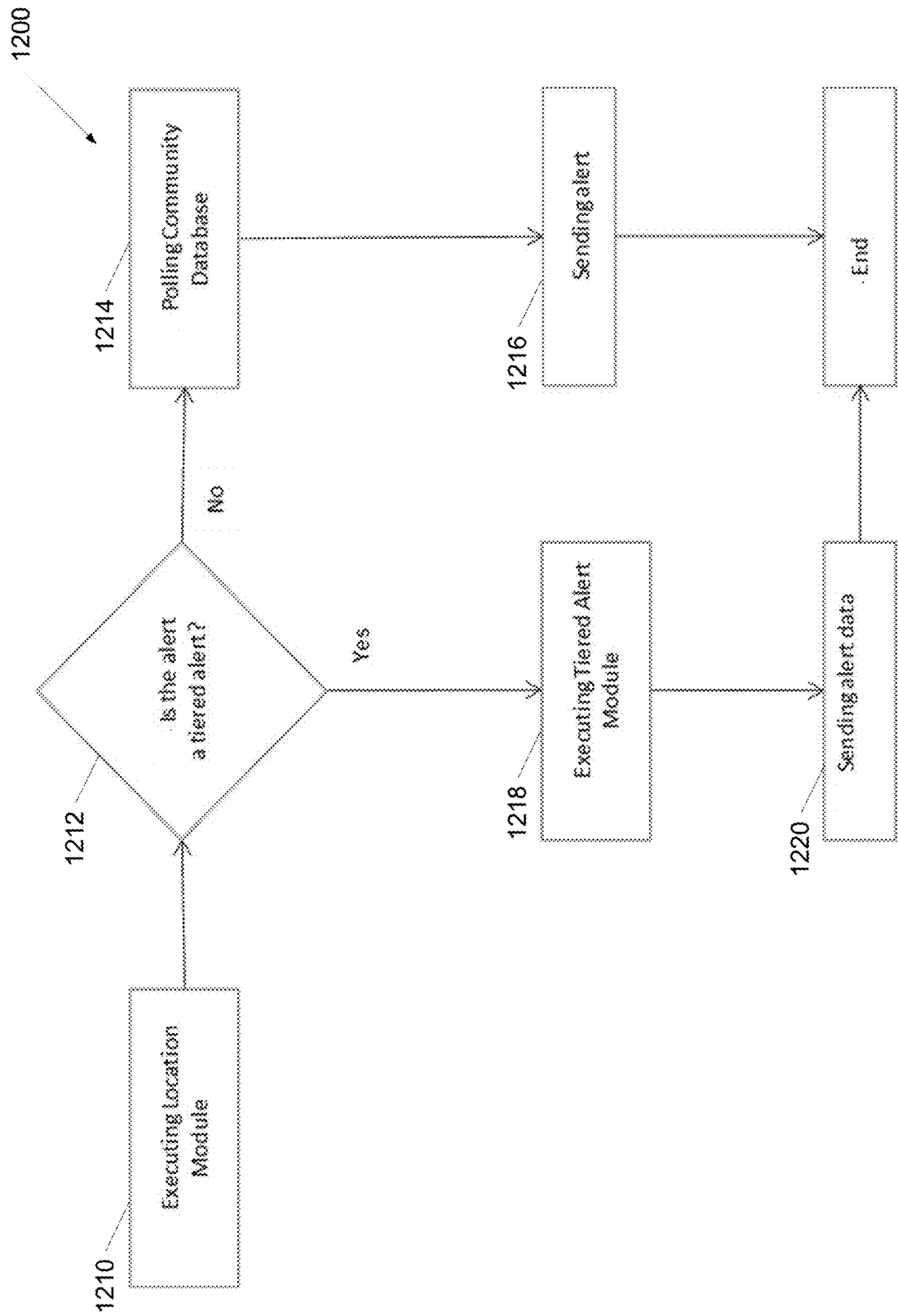
FIG. 12 depicts a flow chart for sending alerts according to one or more aspects of the disclosure.

FIG. 12 depicts a flow chart for sending alerts according to one or more aspects of the disclosure. Some or all of the steps of process 1200 may be performed using any of the computing devices and/or combination thereof described herein. In a variety of embodiments, some or all of the steps described below may be combined and/or divided into sub-steps as appropriate.

At step 1210, an emergency alert server system can obtain alert data. The alert data can include all the data associated with the specific alert such as, but not limited to, what the alert is, the actions required, what type of alerts are to be sent to which mobile devices, etc. The emergency alert server system can update the location of all mobile devices in a particular community so that the alerts can be provided to the correct subset of mobile devices. At step 1212, the emergency alert server system can determine if the alert data is associated with a general and/or tiered alert. A general alert is provided to all mobile devices and is not based on any specific variable that would determine that different mobile devices would receive a different type of alert based on some variable such as location, user type, title, subscription level, and/or custom preferences. For example, a general alert for a fire alarm would go out to all users within the location of a building to evacuate. If the alert is a tiered alert, the process can proceed to step 1218. If the alert is a general alert, the process can proceed to step 1214.

At step 1214, the emergency alert server system can query a community database to identify one or more mobile devices associated with the community that is indicated in the alert data. At step 1216, the emergency alert server system can transmit the alert to the identified mobile devices in the community and the process ends. At step 1218, if the alert is a tiered alert, the emergency alert server system can query the alert database to identify different alerts to be provided to each tier indicated in the alert database. At step 1220, the emergency alert server system can generate different alerts for each tier indicated for the obtained alert data. Each alert can be customized based on the specific criteria stored in the alert database and targeted toward a specific set (e.g. a subset of a community and/or different communities) of mobile devices. The emergency alert server system can transmit the various alerts to the appropriate set of mobile devices based on the tier indicated for the alert.

Figure 13:
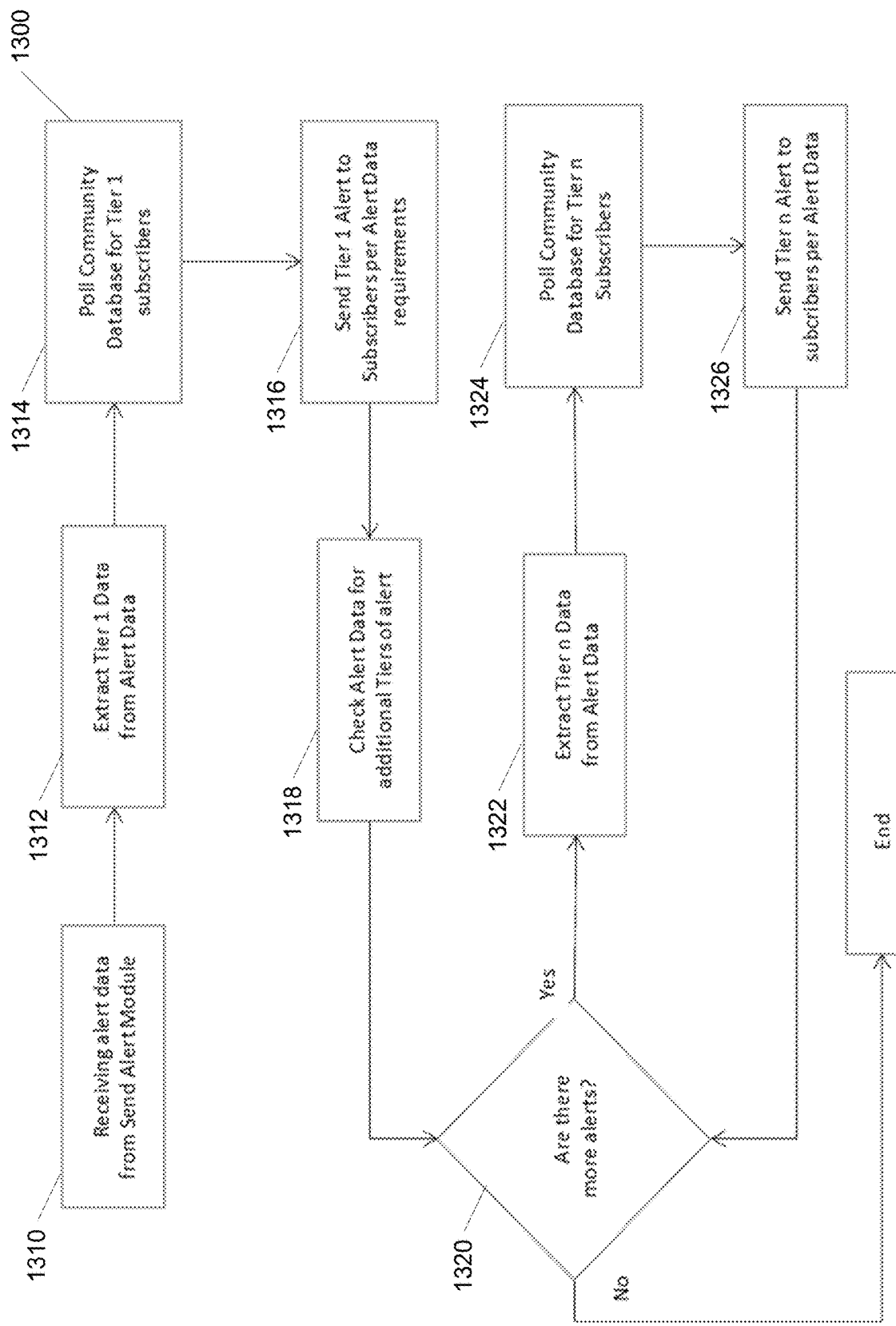
FIG. 13 depicts a flow chart for transmitting tiered alerts according to one or more aspects of the disclosure.

FIG. 13 depicts a flow chart for transmitting tiered alerts according to one or more aspects of the disclosure. Some or all of the steps of process 1300 may be performed using any of the computing devices and/or combination thereof described herein. In a variety of embodiments, some or all of the steps described below may be combined and/or divided into sub-steps as appropriate.

At step 1310, an emergency alert server system can obtain tiered alert data. The tiered alert data indicates what the alert is, the different tiers for the alert and the different alert types for each tier, and the like. The alert type may include test, video, visual, audio, haptic, and/or any combination of notifications that can be provided by a mobile device. The different tiers of an alert may be based on any number of variables depending on the alert, such as location, a user's subscription level, position within the community (e.g. administrator), and the like. At step 1312, the emergency alert server system can extract a first tier of alerts from the alert data. For example, if a tiered alert has different tiers of alerts based on a user's proximity to an event, the first tier data can include the type of alerts that are sent to the tier 1 users, specific messaging, etc. The different tiers of alerts may be based on differing levels of urgency. In this example, tier 1 mobile devices can be closest to the event and may receive multiple types of alert to get their attention due to the urgency and/or proximity. For example, tier 1 uses within a certain distance to a suspicious package can receive a text, audible, visual (e.g. flashing light), haptic vibration, and a visual map of where the suspicious package is. Increasing tier levels may provide fewer notifications for the same alert. For example, a tier 3 message may only include a text message for the same event. At step 1314, the emergency alert server system can query a community database to identify the mobile devices that meet the tiered criteria. The distance and/or proximity for each tier can be indicated in the alert data. In this example, the alert is based on proximity to the event and tier 1 users can include those mobile devices that are within 100' of the suspicious package. Additional tiers can be determined based on how much further the mobile devices are from the event. In several embodiments, tier 2 users can be between 100' and 150' from the event, while tier 3 users can be over 150' from the event. At step 1316, the emergency alert server system can transmit the alert to the first tier of mobile devices. For example, users that are determined to be tier 1 because of their proximity to an event such as a suspicious package would receive multiple types of alert to express urgency and to get their attention.

At step 1318, the emergency alert server system can determine if there are additional tiers of alerts that need to be sent out. There may be any number of tiers of the alert based on the event and how the alert is programmed in the alert database. At step 1320, if no more tiered alert needs to be sent out, the process ends. If another tier is determined in the alert data, the next tier of tiered alert data is extracted at step 1322. At step 1324, the emergency alert server system can query the community database to identify the subscribers or users that meet the tiered criteria for tier n. Once the tier n subscribers or users are identified, the appropriate alert can be sent to the appropriate mobile devices at step 1326.

An emergency alert server system may obtain a new alert message that is created by a user via a user interface on their mobile device. The emergency alert server system can query the community database to determine which subscribers are associated with the alert message. The alert message can be sent to the appropriate mobile devices based on the alert message. In some instances, such as an evacuation alert, mobile devices that are determined not to be at the location being evacuated would not need to receive the evacuation alert. The emergency alert server system can gather and send the custom alert preference on a per-user basis. In a variety of embodiments, the user's custom alert preferences are stored on the mobile device. The mobile device can obtain alerts and use custom alert preferences to modify the received alert in accordance with the user preferences. In many embodiments, the modification of alerts is based on the geographic location of the mobile device. However, any other preferences can be applied based on other variables such as, but not limited to, the purpose of the alert message, the time of day, etc.

FIG. 14 depicts a community database according to one or more aspects of the disclosure. The community database 1400 includes subscriber data such as, but not limited to, the user's name, the group or community they are subscribed to, the type of mobile device, the current location of the mobile device, and the user's custom preference for the type of alert and alert scenarios. The community database may be customized to contain any subscriber information to accommodate various communities and/or custom alerts as needed.

Figure 15:
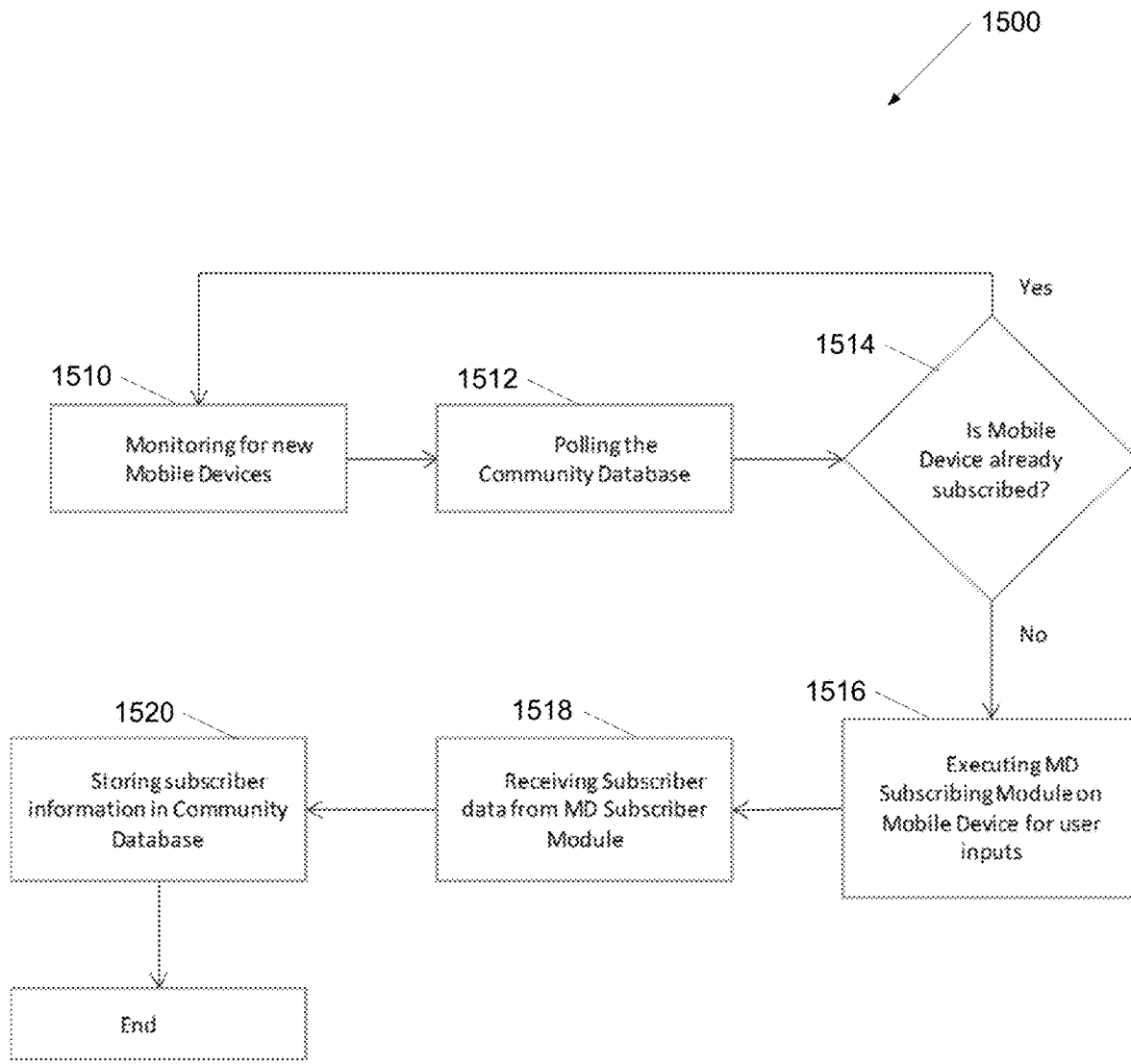
FIG. 15 depicts a flow chart for generating subscriptions according to one or more aspects of the disclosure.

FIG. 15 depicts a flow chart for generating subscriptions according to one or more aspects of the disclosure. Some or all of the steps of process 1500 may be performed using any of the computing devices and/or combination thereof described herein. In a variety of embodiments, some or all of the steps described below may be combined and/or divided into sub-steps as appropriate.

At step 1510, an emergency alert server system can monitor a particular geographic area for new mobile devices entering the area. The geographic area may be indicated by a particular geofence and/or any other criteria as appropriate. The emergency alert server system can monitor for any new subscribers by detecting if a mobile device outside of the geographic area has requested to join one or more communities associated with the geographic area. At step 1512, the emergency alert server system can query the community database to confirm that the identified mobile devices are new and/or already registered with the appropriate communities. At step 1214, if the detected mobile device is already subscribed in the community database, the emergency alert server system can ignore the request and the process can return to step 1510. If the detected mobile device is not included in the community(es) associated with the geographic area, the emergency alert server system can prompt the user to subscribe to the community using their mobile device at step 1516. The emergency alert server system can obtain subscription information at step 1518. In several embodiments, if the mobile device has requested to join the community, the emergency alert server system can use the subscription information included in the request. At step 1520, the emergency alert server system can store the subscriber data in the community database.

Figure 16:
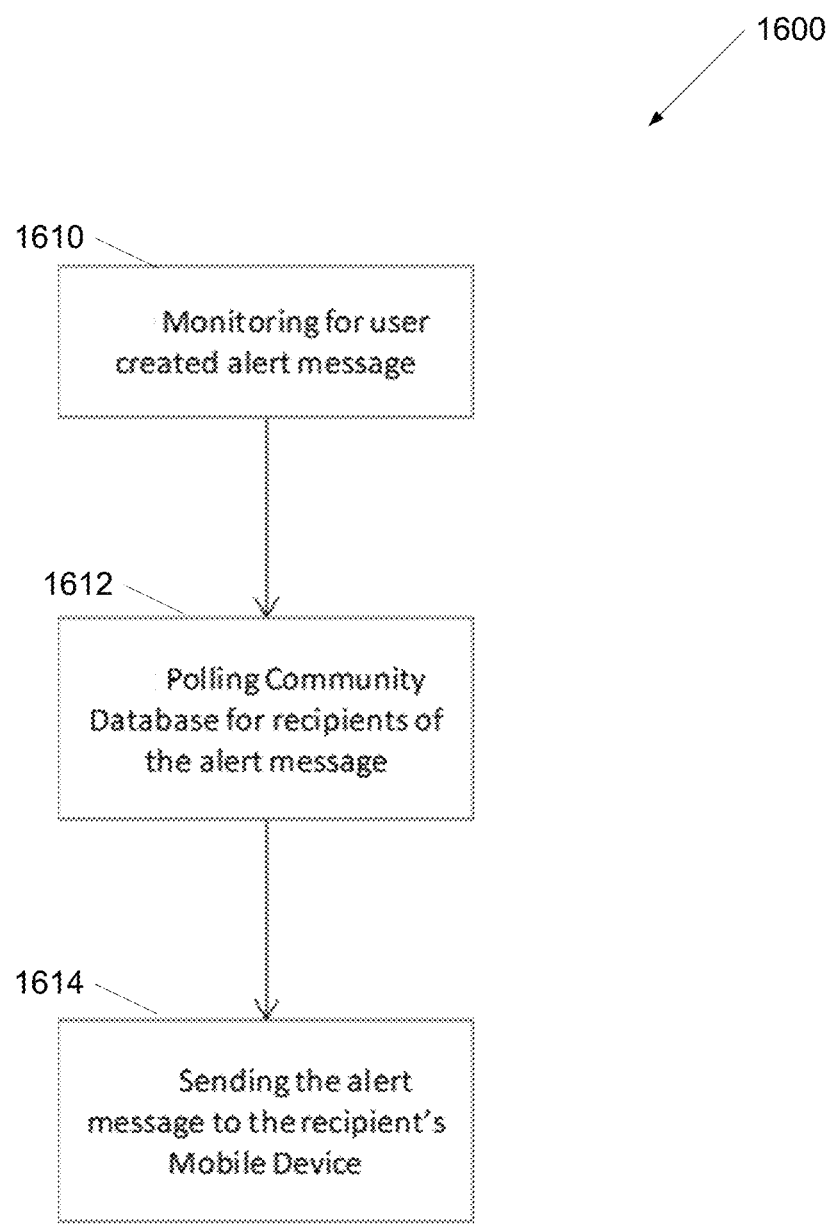
FIG. 16 depicts a flow chart for providing alerts according to one or more aspects of the disclosure.

FIG. 16 depicts a flow chart for providing alerts according to one or more aspects of the disclosure. Some or all of the steps of process 1600 may be performed using any of the computing devices and/or combination thereof described herein. In a variety of embodiments, some or all of the steps described below may be combined and/or divided into sub-steps as appropriate.

At step 1610, an emergency alert server system can monitor for an alert message created by a user. The alert message may be created using a user interface on a mobile device. At step 1612, the emergency alert server system can query a community database to determine which users should receive the alert message as it may not relate to all subscribers or users. For example, if the alert is for an evacuation of a building, subscribers not in the building would not need to receive the message. At step 1614, the emergency alert server system can transmit the alert to the appropriate mobile devices indicated in the community database.

Figure 17:
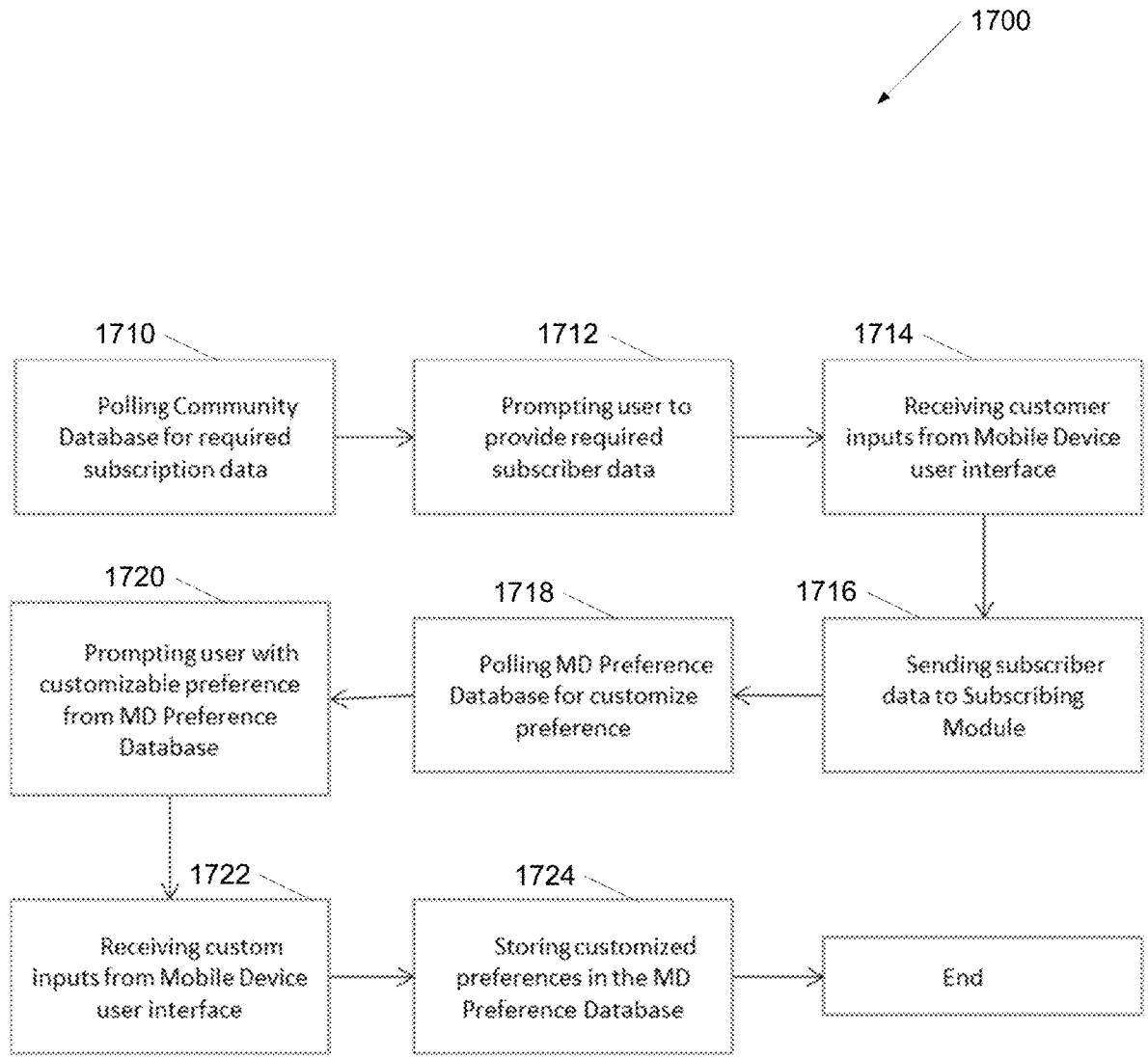
FIG. 17 depicts a flow chart for subscribing mobile devices according to one or more aspects of the disclosure.

FIG. 17 depicts a flow chart for subscribing mobile devices according to one or more aspects of the disclosure. Some or all of the steps of process 1700 may be performed using any of the computing devices and/or combination thereof described herein. In a variety of embodiments, some or all of the steps described below may be combined and/or divided into sub-steps as appropriate.

At step 1710, a mobile device can query a community database to obtain information that the user needs to input via a user interface to subscribe to a community. The information that is required to subscribe to a community may differ from community to community and be based on the requirements of each community. At step 1712, the mobile device can obtain input data providing the data necessary to fulfil the requirements of the requested community. At step 1714, an emergency alert server system can obtain an indication of the community and the input data from the mobile device. At step 1716, the emergency alert server system can register the mobile device with the community by storing the input data in the community database. At step 1718, the emergency alert server system can determine particular properties of alerts for the community that can be customized by the user. At step 1720, the mobile device can provide a user interface for obtaining user preference data for particular alerts. The user interface can provide a step-by-step process for creating custom alert settings and preferences. This information for custom preferences can be obtained from one or more alert databases. For example, the user may be prompted to select specific area or time the user would prefer to get silent alerts (e.g. alerts including haptic and flashing lights) with an alert message. In this example, a user can select to have silent alerts when they are in the library. When the user's location is determined to be in the library, the mobile device would only provide alerts with the indicated haptic and flashing alert types when an alert message is sent. Furthermore, the user could also be prompted to select times of day that they would like to opt out of the alerting system, such as at night when they are sleeping. The user could also determine to always allow specific alerts through no matter the location or time, such as an evacuation alert for a fire or some other danger. At step 1722, the user preference data can be obtained by the emergency alert server system. At step 1724, the emergency alert server system can store the user preferences. In this way, user preferences can be applied to alerts provided to the user's mobile device as described herein.

Figure 18:
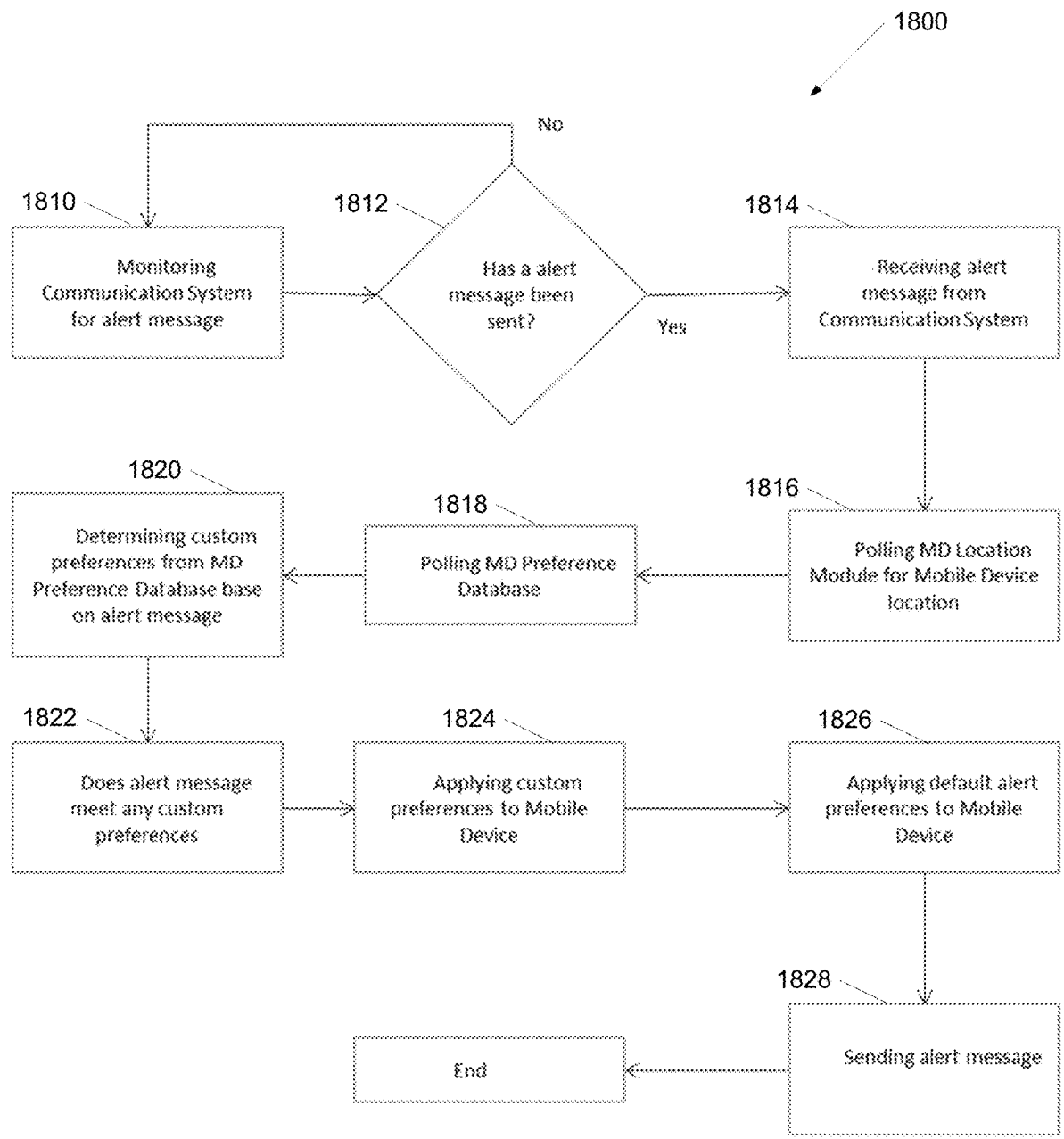
FIG. 18 depicts a flow chart overriding subscriptions according to one or more aspects of the disclosure.

FIG. 18 depicts a flow chart overriding subscriptions according to one or more aspects of the disclosure. Some or all of the steps of process 1800 may be performed using any of the computing devices and/or combination thereof described herein. In a variety of embodiments, some or all of the steps described below may be combined and/or divided into sub-steps as appropriate.

At step 1810, an emergency alert server system can monitor for any alert messages being sent out. The alert messages may be sent from one or more mobile devices in a communication system. The emergency alert server system can identify safety alert messages coming from the communication system and ignores other messages that do not require an override of the "do not disturb" silent features of a mobile device. At step 1812, when an alert message is detected, the emergency alert server system can identify the alert message, e.g. evacuation order, general alert, etc., at step 1814. At step 1816, the emergency alert server system can determine the current location of the mobile device. In a variety of embodiments, that the last known location of a mobile device can be sent along with the alert message. At step 1818, the emergency alert server system can determine user preferences and settings. At step 1820, the emergency alert server system can identify the appropriate preferences based on the location of the mobile device and/or type of alert as appropriate. At step 1822, the emergency alert server system can utilize a set of default message preferences when no user preferences have been specified. At step 1824, the user preferences can be applied to the alert. For example, if a user, such as a student, is determined to be in the library when an alert message is received, the user may have set up a setting for silent alert types when in the library, such as a haptic and a flashing light. At step 1824, the emergency alert server system can apply default preferences to the message when the user does not have any matching preferences. For example, the default setting may be to provide an audio alert and haptic regardless of location, time of day, or the nature of the alert message. When the student is in the library and had not created a custom preference to provide silent alerts when at the library, they would instead receive the default audio and haptic notifications for the alert. At step 1828, the emergency alert server system can transmit the alert to the mobile device.

FIG. 19 depicts a preferences database according to one or more aspects of the disclosure. The database 1900 contains user preferences for when, where and what type of alert the user would like to receive when an alert message is sent out. The user preferences can be defined for any alert scenarios based on the alert type (e.g. audio, visual, haptic, etc.), the time of day, and/or location of the mobile device. For example, if a student who is subscribed to the system does not want any alerts distracting him or other students in the library, the student would create a custom preference that would only allow alerts to have visual (e.g. flashing light) and/or haptic feedback to alert the user of an alert message while the user's mobile device is located within the geographic location associated with the library.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied, in whole or in part, in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computer-implemented method, comprising:
obtaining an indication of an alert condition in a building;
determining that the alert condition comprises an emergency condition in a first portion of the building;
determining a location for a plurality of mobile devices, each mobile device being associated with a community for the building;
determining a distance from each mobile device to the first portion of the building;
generating an alert associated with each mobile device within a threshold distance of the first potion of the building;
determining, for a first mobile device within the threshold distance of the first portion of the building, user preference data associated with the first mobile device;
modifying the alert for the first mobile device according to the user preference data;
transmitting each alert to the associated mobile device, wherein the modified alert is transmitted to the first mobile device;

determining, for a second mobile device within the threshold distance of the first portion of the building, second user preference data associated with the second mobile device, wherein the second user preference data is distinct from the first user preference data;

modifying the alert for the second mobile device according to the second user preference data; and transmitting the alert for the second mobile device to the second mobile device.

2. The computer-implemented method of claim 1, wherein the user preference indicates a notification type for the alert, the notification type selected from a group consisting of an audible notification, a visual notification, and a haptic notification.

3. The computer-implemented method of claim 1, further comprising:

determining that another mobile device is located in the building; and automatically adding the another mobile device to the community for the building.

4. The computer-implemented method of claim 1, further comprising:

identifying a mobile device in the plurality of mobile devices for which a location has not been determined;

determining a proxy location for the mobile device; and using the proxy location for the mobile device as the location of the mobile device.

5. The computer-implemented method of claim 1, further comprising:

determining a location for a second plurality of mobile devices in the community, wherein the mobile devices in the second plurality of mobile devices are outside the threshold distance of the first portion of the building;

generating a second alert associated with each mobile device in the second plurality of mobile devices; and transmitting each second alert to the associated second mobile devices.

6. The computer-implemented method of claim 5, wherein:

the alert for the plurality of mobile devices is associated with a first tier of alert for the alert condition; and the alert for the second plurality of mobile devices is associated with a second tier of alert for the alert condition.

7. A computing device, comprising:

a processor; and a memory in communication with the processor and storing instructions that, when read by the processor, cause the computing device to:

obtain an indication of an alert condition in a building;

determine that the alert condition comprises an emergency condition in a first portion of the building;

determine a location for a plurality of mobile devices, each mobile device being associated with a community for the building;

determine a distance from each mobile device to the first portion of the building;

generate an alert associated with each mobile device within a threshold distance of the first potion of the building;

determine, for a first mobile device within the threshold distance of the first portion of the building, user preference data associated with the first mobile device;

modify the alert for the first mobile device according to the user preference data;

transmit each alert to the associated mobile device, wherein the modified alert is transmitted to the first mobile device;

determine, for a second mobile device within the threshold distance of the first portion of the building, second user preference data associated with the second mobile device, wherein the second user preference data is distinct from the first user preference data;

modify the alert for the second mobile device according to the second user preference data; and transmit the alert for the second mobile device to the second mobile device.

8. The computing device of claim 7, wherein the user preference indicates a notification type for the alert, the notification type selected from a group consisting of an audible notification, a visual notification, and a haptic notification.

9. The computing device of claim 7, wherein the instructions, when read by the processor, further cause the computing device to:

determine that another mobile device is located in the building; and automatically add the another mobile device to the community for the building.

10. The computing device of claim 7, wherein the instructions, when read by the processor, further cause the computing device to:

identify a mobile device in the plurality of mobile devices for which a location has not been determined;

determine a proxy location for the mobile device; and use the proxy location for the mobile device as the location of the mobile device.

11. The computing device of claim 7, wherein the instructions, when read by the processor, further cause the computing device to:

determine a location for a second plurality of mobile devices in the community, wherein the mobile devices in the second plurality of mobile devices are outside the threshold distance of the first portion of the building;

generate a second alert associated with each mobile device in the second plurality of mobile devices; and transmit each second alert to the associated second mobile devices.

12. The computing device of claim 11, wherein:

the alert for the plurality of mobile devices is associated with a first tier of alert for the alert condition; and the alert for the second plurality of mobile devices is associated with a second tier of alert for the alert condition.

13. A non-transitory machine-readable medium storing instructions that, when executed by one or more processors, cause the one or more processors to perform steps comprising:

obtaining an indication of an alert condition in a building;

determining that the alert condition comprises an emergency condition in a first portion of the building;

determining a location for a plurality of mobile devices, each mobile device being associated with a community for the building;

determining a distance from each mobile device to the first portion of the building;

generating an alert associated with each mobile device within a threshold distance of the first potion of the building;

determining, for a first mobile device within the threshold distance of the first portion of the building, user preference data associated with the first mobile device;
modifying the alert for the first mobile device according to the user preference data;
transmitting each alert to the associated mobile device, wherein the modified alert is transmitted to the first mobile device;
determining, for a second mobile device within the threshold distance of the first portion of the building, second user preference data associated with the second mobile device, wherein the second user preference data is distinct from the first user preference data;
modifying the alert for the second mobile device according to the second user preference data; and
transmitting the alert for the second mobile device to the second mobile device.

14. The non-transitory machine-readable medium of claim 13, wherein the user preference indicates a notification type for the alert, the notification type selected from a group consisting of an audible notification, a visual notification, and a haptic notification.

15. The non-transitory machine-readable medium of claim 13, wherein the instructions, when executed by one or more processors, further cause the one or more processors to perform steps comprising:

determining that another mobile device is located in the building; and
automatically adding the another mobile device to the community for the building.

16. The non-transitory machine-readable medium of claim 13, wherein the instructions, when executed by one or more processors, further cause the one or more processors to perform steps comprising:

determining a location for a second plurality of mobile devices in the community, wherein the mobile devices in the second plurality of mobile devices are outside the threshold distance of the first portion of the building;
generating a second alert associated with each mobile device in the second plurality of mobile devices; and
transmitting each second alert to the associated second mobile devices.

17. The non-transitory machine-readable medium of claim 16, wherein:

the alert for the first plurality of mobile devices is associated with a first tier of alert for the alert condition; and
the alert for the second plurality of mobile devices is associated with a second tier of alert for the alert condition.

* * * * *